(12) United States Patent
Flynn et al.

(10) Patent No.: US 11,869,223 B2
(45) Date of Patent: Jan. 9, 2024

(54) IN-TREE GEOMETRY QUANTIZATION OF POINT CLOUDS

(71) Applicant: APPLE INC., Cupertino, CA (US)

(72) Inventors: David Flynn, Cupertino, CA (US); Khaled Mammou, Cupertino, CA (US); Fabrice A. Robinet, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/791,692

(22) PCT Filed: Jan. 8, 2021

(86) PCT No.: PCT/US2021/012827
§ 371 (c)(1),
(2) Date: Jul. 8, 2022

(87) PCT Pub. No.: WO2021/142361
PCT Pub. Date: Jul. 15, 2021

(65) Prior Publication Data
US 2023/0053544 A1 Feb. 23, 2023

Related U.S. Application Data

(60) Provisional application No. 62/958,689, filed on Jan. 8, 2020, provisional application No. 62/958,688, filed on Jan. 8, 2020.

(51) Int. Cl.
*G06T 9/40* (2006.01)
*G06T 17/00* (2006.01)

(52) U.S. Cl.
CPC .............. *G06T 9/40* (2013.01); *G06T 17/005* (2013.01); *G06T 2210/56* (2013.01)

(58) Field of Classification Search
CPC ... G06T 17/005; G06T 2210/56; G06T 9/001; G06T 9/40
See application file for complete search history.

(56) References Cited

U.S. PATENT DOCUMENTS

2017/0324643 A1* 11/2017 Seregin .................. H04N 19/40
2019/0095548 A1* 3/2019 Ioannatos ............... G06F 30/13
(Continued)

FOREIGN PATENT DOCUMENTS

| CA | 3090465 | 8/2019 | |
|---|---|---|---|
| EP | 3553746 | 10/2019 | |
| WO | WO-2018182184 A1 * | 10/2018 | ........... H04N 19/119 |

OTHER PUBLICATIONS

[No Author Listed], "G-PCC Codec Description v4," ISO/IEC JTC1/SC29/WG11 N18673, Gothenburg, SE, Jul. 2019, 62 pages.
(Continued)

*Primary Examiner* — Ming Wu
(74) *Attorney, Agent, or Firm* — Fish & Richardson P.C.

(57) ABSTRACT

An example method includes receiving (502) a plurality of points that represent a point cloud; representing a position of the point in each dimension of a three-dimensional space as a sequence of bits (504), where the position of the point is encoded according to a tree data structure; partitioning (506) at least one of the sequences of bits into a first portion of bits and a second portion of bits; quantizing (508) each of the second portions of bits according to a quantization step size, where the quantization step size is determined according to an exponential function having a quantization parameter value as an input and the quantization step size as an output; and generating (510) a data structure representing the point cloud and including the quantized second portions of bits.

20 Claims, 15 Drawing Sheets

(56) References Cited

U.S. PATENT DOCUMENTS

2019/0323919 A1* 10/2019 Fung-A Wing ...... G05D 7/0635
2019/0325614 A1 10/2019 Krishnaprasad et al.
2023/0046917 A1 2/2023 Flynn et al.

OTHER PUBLICATIONS

Flynn et al., "G-PCC CE13.29 report on in-tree geometry quantization," ISO/IEC JCTC1/SC29/WG11 MPEP/m53389, Online, Apr. 2020, 9 pages.

Flynn et al., "G-PCC: An IDCM specific QP for in-tree geometry quantization," ISO/IEC JCTC1/SC29/WG11 MPEG/m52523, Brussels, Belgium, Jan. 2020, 3 pages.

Flynn et al., "G-PCC: Geometry octree QP constraints," ISO/IEC JCTC1/SC29/WG11 MPEG/m53682, Online, Apr. 2020, 2 pages.

Flynn et al., "G-PCC: Integer step sizes for in-tree geometry quantization," ISO/IEC JTC1/SC29/WG11 MPEG2019/m52522, Brussels, Belgium, Jan. 2020, 4 pages.

International Preliminary Report on Patentability in International Appln. No. PCT/US2021/012827, dated Jul. 21, 2022, 10 pages.

International Preliminary Report on Patentability in International Appln. No. PCT/US2021/012828, dated Jul. 21, 2022, 9 pages.

International Search Report and Written Opinion in International Appln. No. PCT/US2021/012827, dated Apr. 26, 2021, 18 pages.

International Search Report and Written Opinion in International Appln. No. PCT/US2021/012828, dated Apr. 8, 2021, 17 pages.

Liu et al., "A Comprehensive Study and Comparison of Core Technologies for MPEG 3D Point Cloud Compression," IEEE Transactions on Broadcasting, Dec. 20, 2019, 17 pages.

Zhang et al., "[G-PCC] EE13.6 report on geometry quantization," ISO/IEC JTC1/SC29/WG11 MPEG2019/m50924, Geneva, Switzerland, Oct. 2019, 12 pages.

Zhang et al., "[G-PCC][New proposal] Signaling delta QPs for adaptive geometry quantization in point cloud coding," ISO/IEC JTC1/SC29/WG11 MPEG2019/m49232, Gothenburg, Sweden, Jul. 2019, 10 pages.

* cited by examiner

IN-TREE GEOMETRY QUANTIZATION OF POINT CLOUDS

CROSS-REFERENCE TO RELATED APPLICATION

This application claims priority under 35 U.S.C. 371 to International Application No. PCT/US2021/012827, filed on Jan. 8, 2021, which claims priority from U.S. Provisional Application Ser. No. 62/958,688, filed on Jan. 8, 2020, and U.S. Provisional Application Ser. No. 62/958,689, filed on Jan. 8, 2020, which are incorporated herein by reference in their entirety.

TECHNICAL FIELD

This disclosure relates generally to storing and processing information regarding point clouds that include a plurality of points.

BACKGROUND

Various types of sensors, such as light detection and ranging (LIDAR) systems, 3-D-cameras, 3-D scanners, etc. may capture data indicating positions of points in three dimensional space, for example positions in the X, Y, and Z planes. Also, such systems may further capture attribute information in addition to spatial information for the respective points, such as color information (e.g., RGB values), intensity attributes, reflectivity attributes, motion related attributes, modality attributes, or various other attributes. In some circumstances, additional attributes may be assigned to the respective points, such as a time-stamp when the point was captured. Points captured by such sensors may make up a "point cloud" including a set of points each having associated spatial information and one or more associated attributes. In some circumstances, a point cloud may include thousands of points, hundreds of thousands of points, millions of points, or even more points. Also, in some circumstances, point clouds may be generated, for example in software, as opposed to being captured by one or more sensors. In either case, such point clouds may include large amounts of data and may be costly and time consuming to store and transmit.

SUMMARY

In an aspect, a method includes receiving, by a computer system, a plurality of points that represent a point cloud in three-dimensional space; representing, by the computer system for each point, a position of the point in each dimension of the three-dimensional space as a sequence of bits, where the position of the point is encoded according to a tree data structure; partitioning, by the computer system, at least one of the sequences of bits into a first portion of bits and a second portion of bits; quantizing, by the computer system, each of the second portions of bits according to a quantization step size, where the quantization step size is determined according to an exponential function having a quantization parameter value as an input and the quantization step size as an output; generating, by the computer system, a data structure representing the point cloud in the three-dimensional space, the data structure including the quantized second portions of bits; and at least one of transmitting or storing the data structure by the computer system.

Implementations of this aspect can include one or more of the following features.

In some implementations, the tree data structure can be an octree.

In some implementations, partitioning at least one of the sequences of bits can include partitioning at least one of the sequences of bits such that each of the first portions of bits includes the first d bits from a corresponding one of the sequences of bits, where d is a scaling depth of the tree data structure; and partitioning at least one of the sequences of bits such that each of the second portions of bits includes a remainder of bits from the corresponding one of the sequences of bits.

In some implementations, quantizing each of the second portions of bits can include dividing a numerical value indicated by each of the second portions of bits by the quantization step size.

In some implementations, the method can also include indicating at least one of the quantization step size or the quantization parameter value in the data structure.

In some implementations, the exponential function can be selected such that, for positive integer quantization parameter values, a majority of the quantization step sizes outputted by the exponential function are integers.

In some implementations, the exponential function can be selected such that, for positive integer quantization parameter values, N of the quantization step sizes outputted by the exponential function are non-integers where $N=(p\times\log_2 p)-p+1$, and where p is the number of quantization parameters per doubling of the quantization step size.

In some implementations, the exponential function can be $QS=0.125*(\mod [QP, 8])*2^{\wedge}(\text{floor } [QP/8])$, where QS is the quantization step size, and QP is the quantization parameter value.

In some implementations, the method can further include approximately at least some of the quantized second portions of bits as integer values.

In another aspect, a method includes receiving, by a computer system, a plurality of points that represent a point cloud in three-dimensional space; and generating, by the computer system, a data structure representing the point cloud in the three-dimensional space. The data structure includes a header portion, and a data portion following the header portion. The data portion indicates, for each of the points, a position of a point encoded according to a tree data structure and quantized according to a corresponding quantization parameter. The tree data structure has a plurality of tree levels. The data portion includes offset values indicating, at one or more of the tree levels, a difference between the quantization parameter used to quantize the positions of the points at the one or more tree levels and a base quantization parameters. The data portion includes, at each of the one or more tree levels, a data flag indicating a presence of one or more of the offset values at that tree level. The method also includes at least one of transmitting or storing the data structure by the computer system.

Implementations of this aspect can include one or more of the following features.

In some implementations, for each of the one or more tree levels, the data flag can be included at a beginning of that tree level.

In some implementations, the tree data structure can be an octree.

In some implementations, the header portion does not include data indicating a presence of the offset values.

In another aspect, a method includes receiving, by a computer system, a data structure representing a point cloud in three-dimensional space. The point cloud has a plurality of points. The data structure includes a header portion, and a data portion following the header portion. The data portion indicates, for each of the points, a position of a point encoded according to a tree data structure and quantized according to a corresponding quantization parameter. The tree data structure has a plurality of tree levels. The data portion includes offset values indicating, at one or more of the tree levels, a difference between the quantization parameter used to quantize the positions of the points at the one or more tree levels and a base quantization parameter. The data portion includes, at each of the one or more tree levels, a data flag indicating a presence of one or more of the offset values at that tree level. The method also includes determining, by the computer system, the position of each of the points based on the data structure; and outputting, by the computer system, the determined positions of each of the points.

Implementations of this aspect can include or more of the following features.

In some implementations, determining the position of each of the points based on the data structure can include determining, based on the data flag at a particular tree level, that one or more of the offset values are present at that tree level; determining the quantization parameter used to quantize the positions of the points that tree level based on the offset values at that tree level; and determining the position of each of the points at that tree level based on the determined quantization parameter.

In some implementations, the tree data structure can be an octree.

In some implementations, the method can also include rendering three-dimensional content based on the determinate positon of each of the points. The three-dimensional content can be least one of virtual reality content or augmented reality content.

In another aspect, a method includes receiving, by a computer system, a data structure representing a plurality of points in a point cloud in three-dimensional space; decoding, by the computer system, the data structure to determine one or more sequences of bits, where each of the sequences of bits represents a position of one of the points in one of the dimensions of the three-dimensional space, and where the data structure is decoded according to a tree data structure; partitioning, by the computer system, at least one of the sequences of bits into a first portion of bits and a second portion of bits; scaling, by the computer system, each of the second portions of bits according to a quantization step size, where the quantization step size is determined according to an exponential function having a quantization parameter value as an input and the quantization step size as an output; generating, by the computer system, a reconstructed point position of at least one of the points by combining, for each of the at least one of the points, the first portion of bits and the scaled second portion of bits corresponding to that point; and outputting, by the computer system, the reconstructed point position of the least one of the points.

Implementations of this aspect can include one or more of the following features.

In some implementations, the tree data structure can be an octree.

In some implementations, partitioning at least one of the sequences of bits can include partitioning at least one of the sequences of bits such that each of the first portions of bits includes the first d bits from a corresponding one of the sequences of bits, wherein d is a scaling depth of the tree data structure, and partitioning at least one of the sequences of bits such that each of the second portions of bits includes a remainder of bits from the corresponding one of the sequences of bits.

In some implementations, scaling each of the second portions of bits can include multiplying a numerical value indicated by each of the second portions of bits by the quantization step size.

In some implementations, at least one of the quantization step size or the quantization parameter value can be indicated in the data structure.

In some implementations, the exponential function can be selected such that, for positive integer quantization parameter values, a majority of the quantization step sizes outputted by the exponential function are integers.

In some implementations, the exponential function can be selected such that, for positive integer quantization parameter values, N of the quantization step sizes outputted by the exponential function are non-integers, where $N=(p\times\log_2 p)-p+1$, and where p is the number of quantization parameters per doubling of the quantization step size.

In some implementations, the exponential function can be $QS=(1+0.125\times\mod[QP, 8])\times 2^{\lfloor QP/8 \rfloor}$, where QS is the quantization step size, and QP is the quantization parameter value.

In some implementations, the method can also include rendering three-dimensional content based on the reconstructed point position of the least one of the points, where the three-dimensional content is at least one of virtual reality content or augmented reality content.

Other implementations are directed to systems, devices, and non-transitory, computer-readable media having instructions stored thereon, that when executed by one or more processors, cause the one or more processors to perform operations described herein.

The details of one or more embodiments are set forth in the accompanying drawings and the description below. Other features and advantages will be apparent from the description and drawings, and from the claims.

Figure 1:
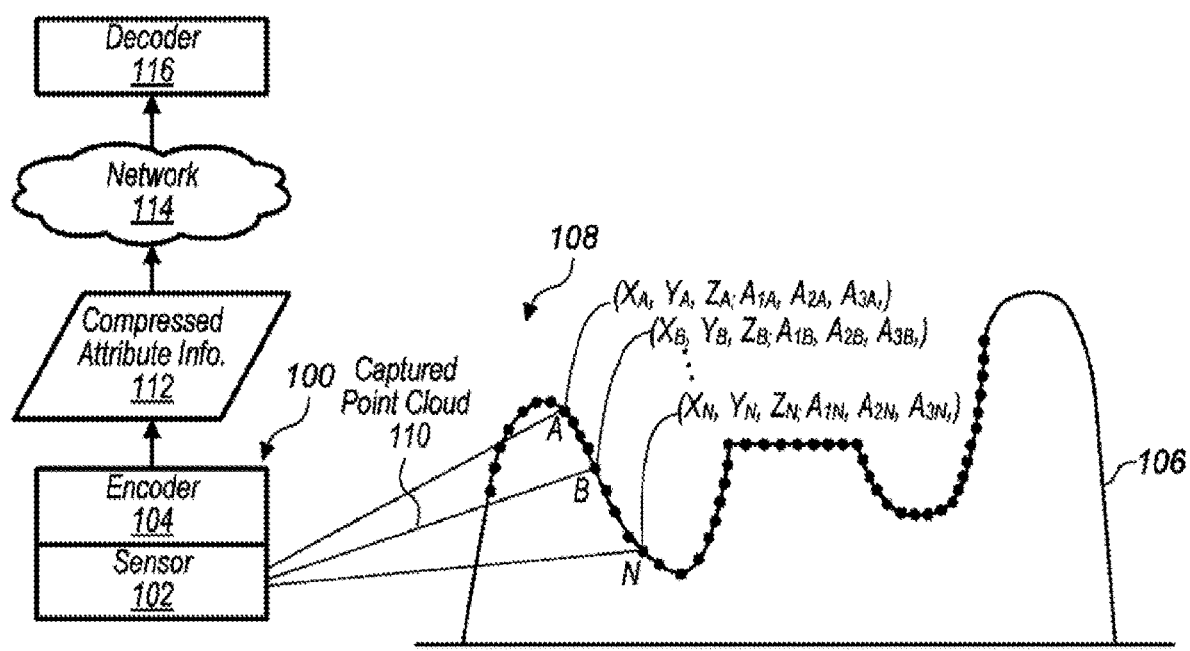
FIG. 1 illustrates a system including a sensor that captures information for points of a point cloud and an encoder that compresses attribute and/or spatial information of the point cloud, where the compressed attribute and/or spatial information is sent to a decoder.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be\ described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

As data acquisition and display technologies have become more advanced, the ability to capture point clouds including thousands or millions of points in 2-D or 3-D space, such as via LIDAR systems, has increased. Also, the development of advanced display technologies, such as virtual reality or augmented reality systems, has increased potential uses for point clouds. However, point cloud files are often very large and may be costly and time-consuming to store and transmit. For example, communication of point clouds over private or public networks, such as the Internet, may require considerable amounts of time and/or network resources, such that some uses of point cloud data, such as real-time uses, may be limited. Also, storage requirements of point cloud files may consume a significant amount of storage capacity of devices storing the point cloud files, which may also limit potential applications for using point cloud data.

In some embodiments, an encoder may be used to generate a compressed point cloud to reduce costs and time associated with storing and transmitting large point cloud files. In some embodiments, a system may include an encoder that compresses attribute or spatial information of a point cloud file such that the point cloud file may be stored and transmitted more quickly than non-compressed point clouds and in a manner that the point cloud file may occupy less storage space than non-compressed point clouds. In some embodiments, compression of attributes of points in a point cloud may enable a point cloud to be communicated over a network in real-time or in near real-time. For example, a system may include a sensor that captures attribute information about points in an environment where the sensor is located, where the captured points and corresponding attributes make up a point cloud. The system may also include an encoder that compresses the captured point cloud attribute information. The compressed attribute information of the point cloud may be sent over a network in real-time or near real-time to a decoder that decompresses the compressed attribute information of the point cloud. The decompressed point cloud may be further processed, for example to make a control decision based on the surrounding environment at the location of the sensor. The control decision may then be communicated back to a device at or near the location of the sensor, where the device receiving the control decision implements the control decision in real-time or near real-time. In some embodiments, the decoder may be associated with an augmented reality system and the decompressed attribute information may be displayed or otherwise used by the augmented reality system. In some embodiments, compressed attribute information for a point cloud may be sent with compressed spatial information for points of the point cloud. In other embodiments, spatial information and attribute information may be separately encoded and/or separately transmitted to a decoder.

In some embodiments, a system may include a decoder that receives one or more point cloud files including compressed attribute information via a network from a remote server or other storage device that stores the one or more point cloud files. For example, a 3-D display, a holographic display, or a head-mounted display may be manipulated in real-time or near real-time to show different portions of a virtual world represented by point clouds. In order to update the 3-D display, the holographic display, or the head-mounted display, a system associated with the decoder may request point cloud files from the remote server based on user manipulations of the displays, and the point cloud files may be transmitted from the remote server to the decoder and decoded by the decoder in real-time or near real-time. The displays may then be updated with updated point cloud data responsive to the user manipulations, such as updated point attributes.

In some embodiments, a system, may include one or more LIDAR systems, 3-D cameras, 3-D scanners, etc., and such sensor devices may capture spatial information, such as X, Y, and Z coordinates for points in a view of the sensor devices. In some embodiments, the spatial information may be relative to a local coordinate system or may be relative to a global coordinate system (for example, a Cartesian coordinate system may have a fixed reference point, such as a fixed point on the earth, or may have a non-fixed local reference point, such as a sensor location).

In some embodiments, such sensors may also capture attribute information for one or more points, such as color attributes, reflectivity attributes, velocity attributes, acceleration attributes, time attributes, modalities, and/or various other attributes. In some embodiments, other sensors, in addition to LIDAR systems, 3-D cameras, 3-D scanners, etc., may capture attribute information to be included in a point cloud. For example, in some embodiments, a gyroscope or accelerometer, may capture motion information to be included in a point cloud as an attribute associated with one or more points of the point cloud. For example, a vehicle equipped with a LIDAR system, a 3-D camera, or a 3-D scanner may include the vehicle's direction and speed in a point cloud captured by the LIDAR system, the 3-D camera, or the 3-D scanner. For example, when points in a view of the vehicle are captured they may be included in a point cloud, where the point cloud includes the captured points and associated motion information corresponding to a state of the vehicle when the points were captured.

FIG. 1 illustrates a system including a sensor that captures information for points of a point cloud and an encoder that compresses attribute information of the point cloud, where the compressed attribute information is sent to a decoder.

System 100 includes sensor 102 and encoder 104. Sensor 102 captures a point cloud 110 including points representing structure 106 in view 108 of sensor 102. For example, in some embodiments, structure 106 may be a mountain range, a building, a sign, an environment surrounding a street, or any other type of structure. In some embodiments, a captured point cloud, such as captured point cloud 110, may include spatial and attribute information for the points included in the point cloud. For example, point A of captured point cloud 110 including X, Y, Z coordinates and attributes 1, 2, and 3. In some embodiments, attributes of a point may include attributes such as R, G, B color values, a velocity at the point, an acceleration at the point, a reflectance of the structure at the point, a time stamp indicating when the point was captured, a string-value indicating a modality when the point was captured, for example "walking", or other attributes. The captured point cloud 110 may be provided to encoder 104, where encoder 104 generates a compressed version of the point cloud (compressed attribute information 112) that is transmitted via network 114 to decoder 116. In some embodiments, a compressed version of the point cloud, such as compressed attribute information 112, may be included in a common compressed point cloud that also includes compressed spatial information for the points of the point cloud or, in some embodiments, compressed spatial information and compressed attribute information may be communicated as separate files.

In some embodiments, encoder 104 may be integrated with sensor 102. For example, encoder 104 may be implemented in hardware or software included in a sensor device, such as sensor 102. In other embodiments, encoder 104 may be implemented on a separate computing device that is proximate to sensor 102.

In some circumstances, the number of bits needed to encode attribute information includes a significant portion of bit stream for a point cloud.

In some embodiments, the position of points in the point cloud 110 can be encoded according to a tree data structure. For instance, a three-dimensional space can be recursively subdivided into successively smaller portions. Each of these portions can be represented by a respective node in a tree data structure. The presence of a point in each portion can be indicated in the corresponding node of the tree data structure.

Figure 2:
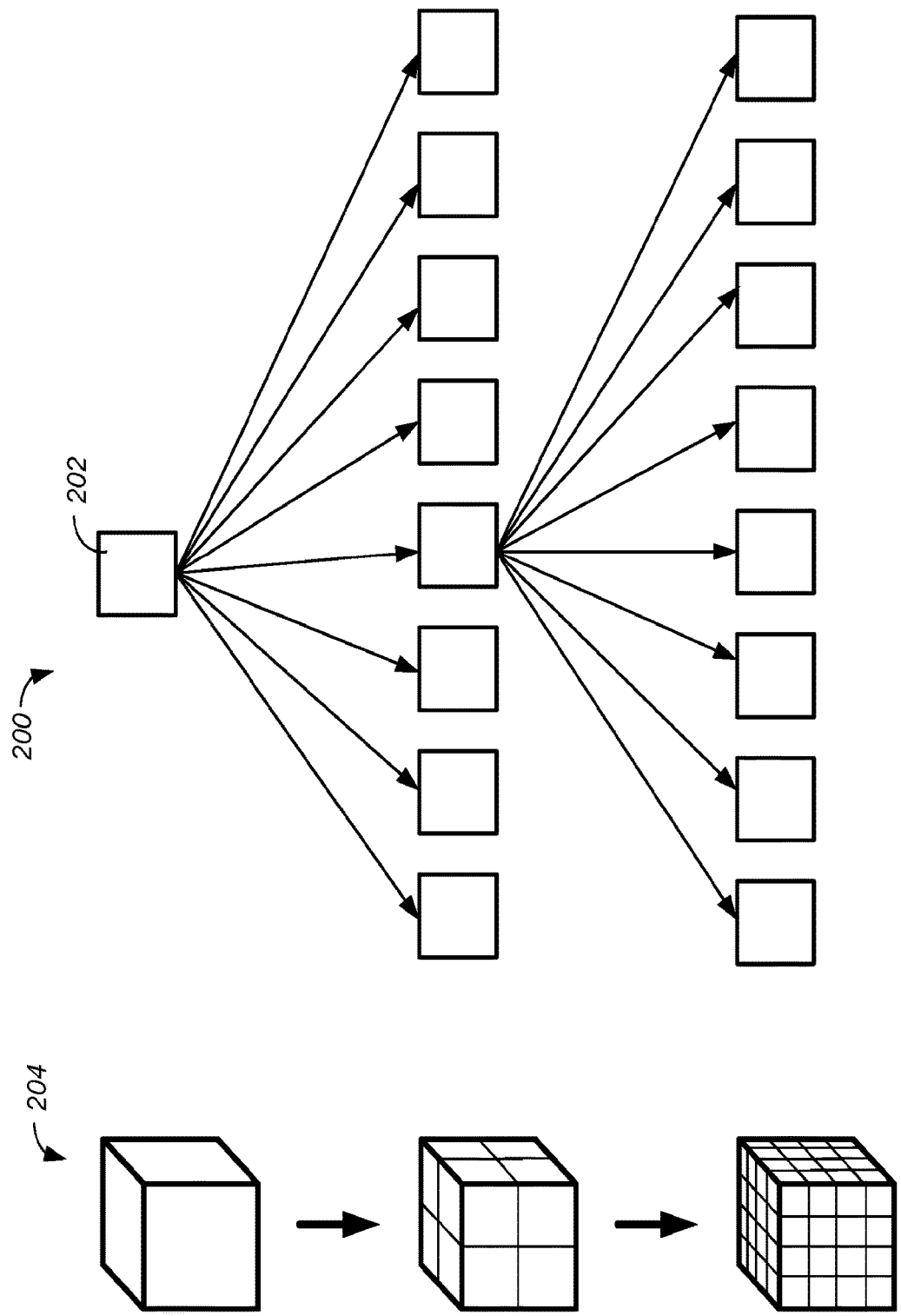
FIG. 2 illustrates an example recursive division of space and a corresponding tree data structure.

As an example, referring to FIG. 2, the position of points in the point cloud 110 can be encoded according to an octree 200, in which each node 202 of the octree 200 has exactly eight child nodes 202. A three-dimensional space 204 can be recursively subdivided into successively smaller octants. Each of these portions can be represented by a respective node 202 in the octree 200. The presence of a point in each portion can be indicated in the corresponding node 202 of the octree (e.g., using a bit "1" to signify the presence of point in the corresponding portion, or a bit "0" to signify an absence of point in the corresponding portion).

An example of encoding the position of points according to a tree data structure is shown in FIGS. 3A-3E. In this example, a number of points 300 on a single two-dimensional plane are encoded according to a quadtree (a tree data structure in which each node has exactly four child nodes). However, it is understood that points in a three-dimensional point cloud can be encoded in a similar manner according to an octree.

Figure 3A:
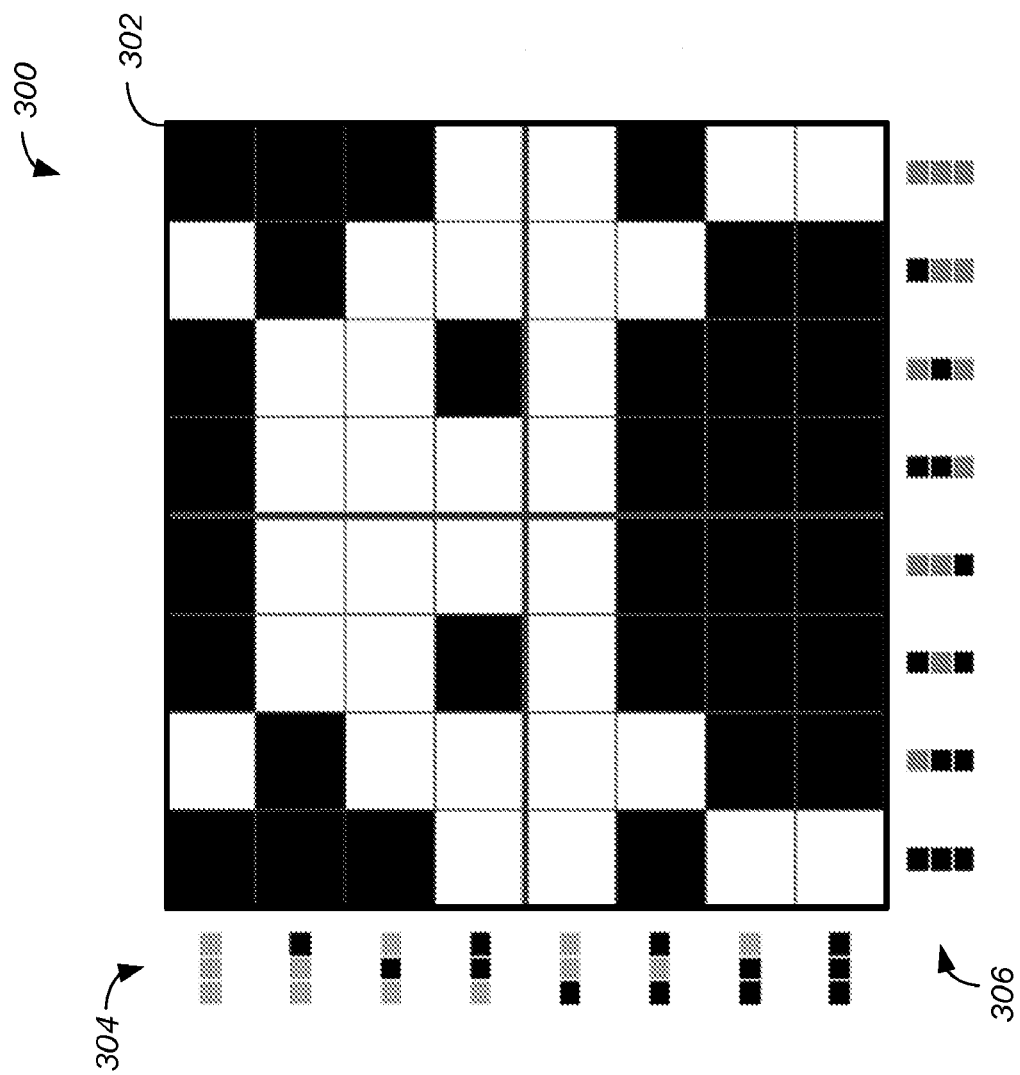
FIGS. 3A-3E illustrates an example encoding of points according to a tree data structure.

As shown in FIG. 3A, a number of points 300 are positioned on a two-dimensional plane. The presence of a point 300 at a particular position is indicated by a white box in a grid 302, whereas the absence of a point 300 at a particular position is indicated by a black box in the grid 302. The rows of the grid 302 are indexed according to respective binary sequences 304 (shown to the right of the grid 302, where black boxes indicate a bit "0" and colored boxes indicate a bit "1"). Similarly, the columns of the grid 302 are indexed according to respective binary sequences 306 (shown to the bottom of the grid 302, where black boxes indicate a bit "0" and colored boxes indicate a bit "1").

Figure 3B:
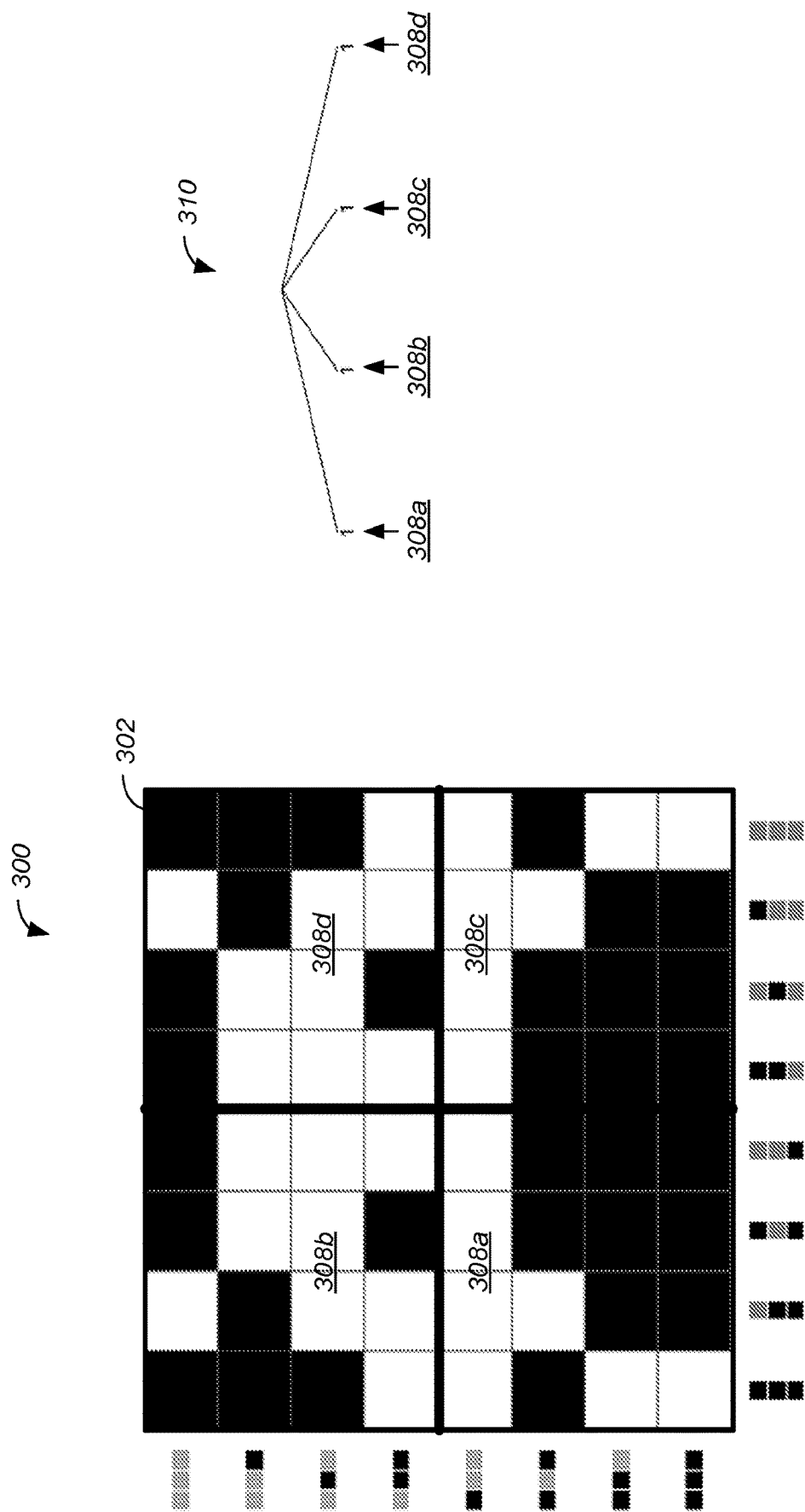

As shown in FIG. 3B, the grid 302 can be divided into four equally sized portions 308a-308d (e.g., squares). This division can be represented by a tree data structure 310 having a parent node, and four child nodes branching from the parent node. The presence of point or more points 300 in each portion 308a-308d can be indicated by a bit "1" in the corresponding child node. Here, as each of the portions 308a-308d includes at least one point 300, each of the child nodes is assigned a bit "1."

Figure 3C:
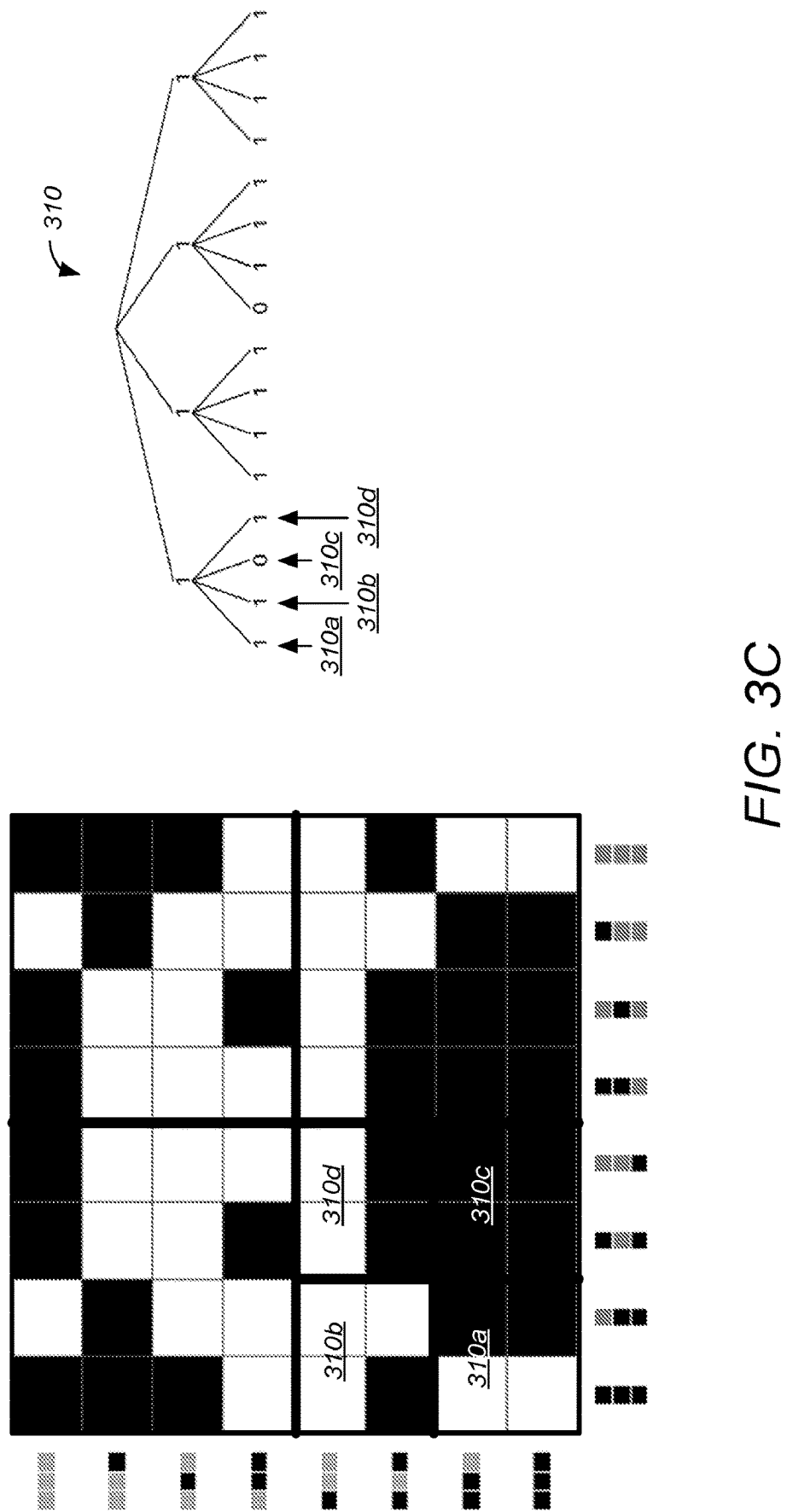

As shown in FIG. 3C, each portion 308a-308d can be further sub-divided into four equally sized sub-portions (e.g., squares). For example, the portion 308a can be sub-divided in portions 310a-310d. This division can be represented by the tree data structure 310 having, for the node corresponding to the portion on 308a, four child nodes branching from that node. The presence of point or more points 300 in each sub-portion 310a-310d can be indicated by a bit "1" in the corresponding child node. Here, as each of the sub-portions 310a, 310b, and 310d includes at least one point 300, the child nodes associated with those sub-portions are each assigned a bit "1." The child node associated with the sub-portion 310c is assigned a bit "0." Similarly, the other portions 308c-308d also can be sub-divided into four equally sub-portions each, and the presence of points in each of the sub-portions can be indicated by the tree data structure 310 in a similar manner as described above.

Figure 3D:
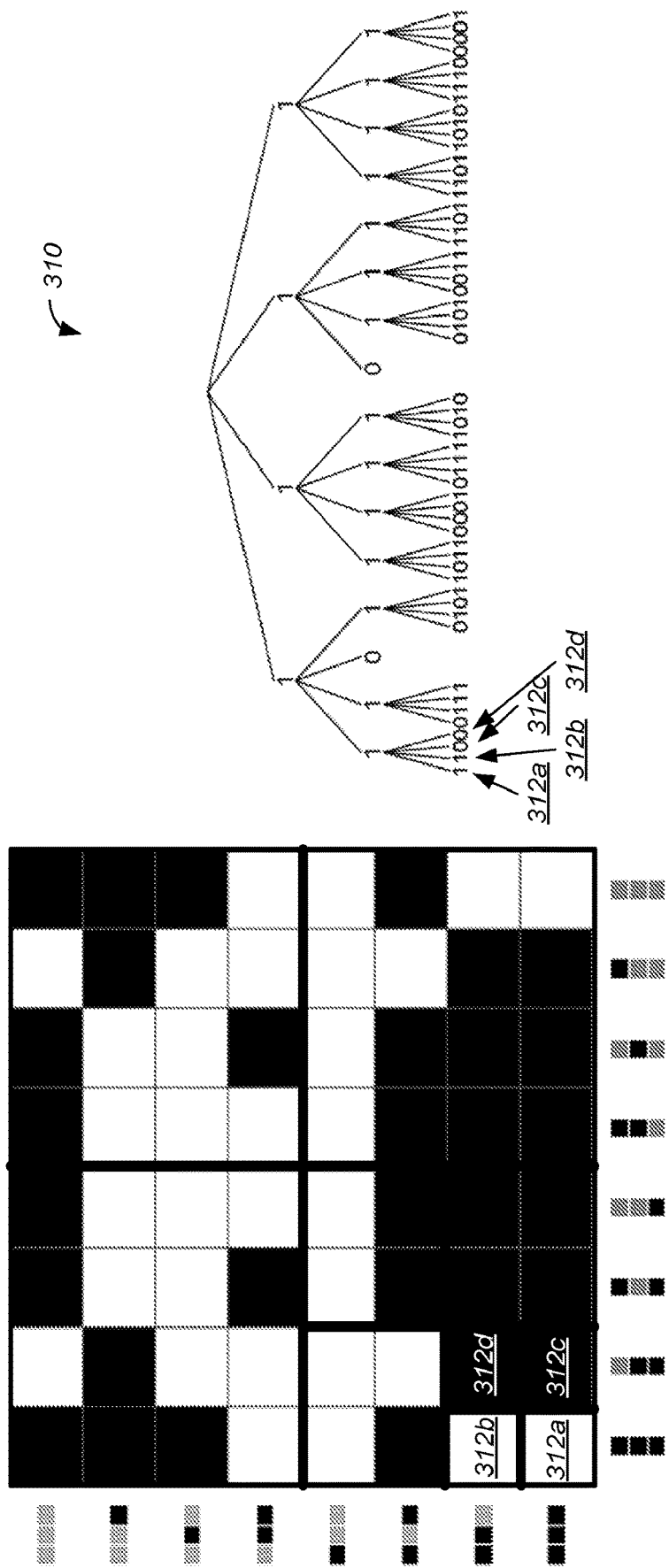
Figure 3E:
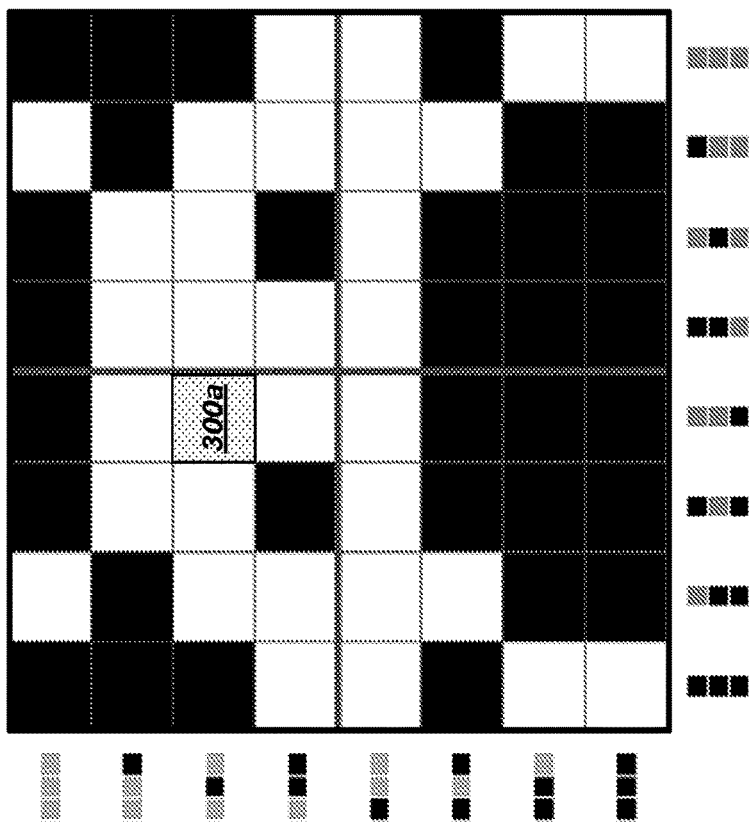
Figure 3E:
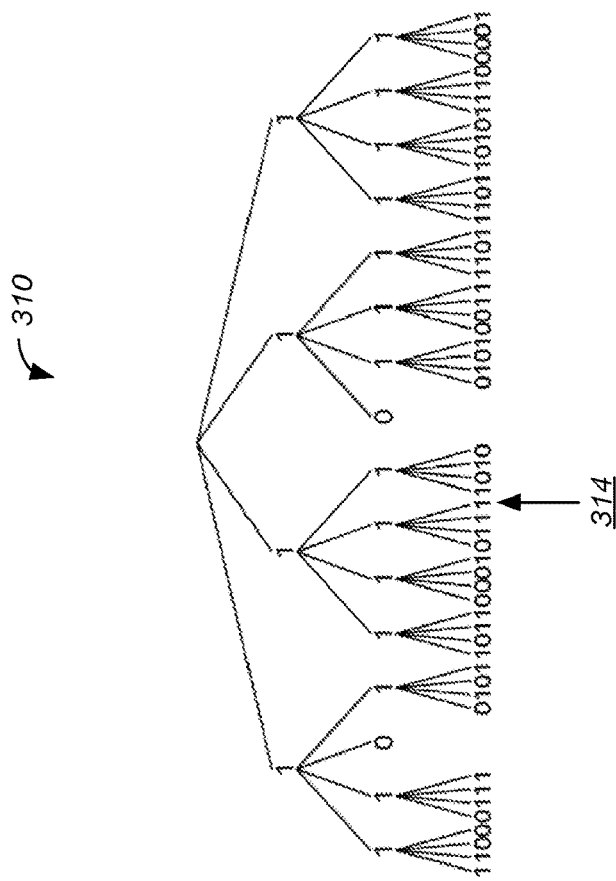

As shown in FIG. 3D, each sub-portion 310a-310d can be further sub-divided into four equally sized sub-portions (e.g., squares). For example, the sub-portion 310a can be sub-divided in sub-portions 312a-312d. This division can be represented by the tree data structure 310 having, for the node corresponding to the sub-portion on 310a, four child nodes branching from that node. The presence of point or more points 300 in each sub-portion 312a-312d can be indicated by a bit "1" in the corresponding child node. Here, as each of the sub-portions 312a and 312b includes at least one point 300, the child nodes associated with those sub-portions are each assigned a bit "1." The child nodes associated with the sub-portions 310c and 310d are each assigned a bit "0." Similarly, the other sub-portions of the grid can be sub-divided into four equally sub-portions each, and the presence of points in each of the sub-portions can be indicated by the tree data structure 310 in a similar manner as described above.

The spatial position of a particular point 300 can be represented by one or more binary sequences. For example, the spatial position of a point 300a with respect to the horizontal axis can be represented by the binary sequence "011" (e.g., corresponding to the index of its column), and the spatial position of the point 300a with respect to the vertical axis can be represented by the binary sequence "101" (e.g., corresponding to the index of its row).

Although a tree data structure 310 having four levels is shown in FIGS. 3A-3D, in practice, a tree data structure can include any number of levels (corresponding to any number of spatial sub-divisions). Further, although FIGS. 3A-3D show a tree data structure 310 having four child nodes branching from each parent node (e.g., a quadtree), in practice, a tree data structure can have any number of child nodes branching from each parent node (e.g., 8 child nodes branching from each parent node, as with an octree).

Quantization Step Size:

In some implementations, during an encoding process, the position of a point can be partially quantized or scaled, such that a reduced number of bits can be used to represent the position (or approximate position) of the point. As an example, an encoder can partition each of the binary sequences representing the point's position into two portions: (i) a first portion including the first d bits of the binary sequence, where d is a particular depth (e.g., representing bits that have already been encoded by the encoder), and (ii) a second portion including the remaining bits of the binary sequence. The second portion can be quantized according to a chosen quantization parameter.

To illustrate, a binary representation of a point's x-position can be represented as $\{b_4, b_3, b_2, b_1, b_0\}$, where x is in the range 0 to 31 inclusive. For instance, x=21=0b10101 (i.e., a binary sequence "10101"). After encoding the first two tree levels, at depth d=2, the first two bits of 0b10101 are discarded, leaving 0b101 (i.e., a decimal value of 5). The remainder can be quantized according to a step size of 2 (e.g., 0b101/2=0b10). This has the effect of reducing the range of the remainder part from decimal values 0 and 7, to decimal values 0 to 3. Since the range has been reduced by a factor of two, only two tree levels are required to signal the remainder, rather than the three levels of the remainder prior to quantization. The reduction in levels can be expressed as Floor(Log 2(QS)), where QS is the quantization step size. A decoder that is informed that quantization occurred with a step size of 2 at tree depth 2 will decode a four bit representation of the corresponding points (5−Floor(Log 2(2))=4). The decoder will scale the quantized portion of the position information (the two least significant bits, 0b10) by the quantization step size QS (0b10*2=0b100) and append the scaled value to the two most significant bits (0b10: 0b100) resulting in a reconstructed position of 0b10100.

Performance of this "in-tree" geometry quantization has various effects. For example, this quantization eliminates levels from the sub-tree of sufficiently quantized nodes, thereby avoiding signaling occupancy for eliminated nodes. Further, this quantization reduces the number of coded points in the tree data structure. Further, this quantization compacts sparse surfaces into a less sparse form. Accordingly, information regarding a point cloud (e.g., the presence and/or position of one or more points in the point cloud) can be stored using less data (e.g., compared to techniques that do not utilization quantization).

However, in some circumstances, this quantization can introduce spatial distortions in the point cloud during the encoding and decoding process, particular when the quantization step size is not an integer value.

For instance, quantization can map points with a node of size nS to a quantized node size of nQ, where nQ≤nS. Accordingly, the quantitation step size QS is nS/nQ. As an example, a three-dimensional node of size 128×128×128 (2,097,152 voxels) may be reduced to a node of size 64×64×64 (262,144 voxels) by using a quantitation step size QS of 2.

In some implementations, the quantitation step size QS can be determined based on an integer quantization parameter QP of an exponential function $f(QP)=QS$. For example, the quantitation step size QS can be determined using the relationship $QS=2^{(QP-4)/6}$. In this example, an increase of QP by 6 (e.g., from 4 to 10) results in a doubling of the quantization step size QS.

In this example, the quantitation step size QS is not integral for given integral values of the quantization parameter QP, except for powers of two. This may introduce distortions during the encoding and decoding process. For example, in some implementations, a geometry encoder can only encode integer point positions (e.g., as specified by a particular codec). However, scaling a quantized position value by a non-integral step size can result in a position with a fractional part, which according to the codec's specification must be rounded to an integer. This discarding of the fractional part may result in visually objectionable artefacts arising from the encoding and decoding process.

Figure 4:
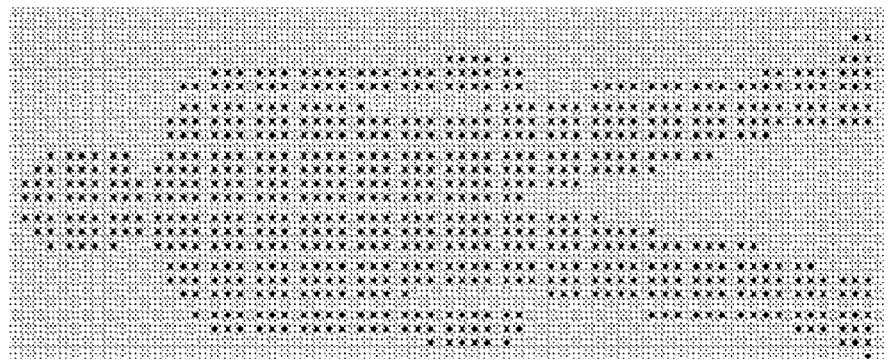
FIG. 4 illustrates example distortions in a point cloud during an encoding and decoding process.

For example, as shown in FIG. 4, a point cloud 400 has been quantized according to a quantization parameter QP=11, which results in a non-integral quantitation step size QS (e.g., QS=2.24492). In this example, a geometry encoder can only encode integer point positions. Accordingly, any positions of points having fractional parts are rounded to an integer. During the decoding process, this rounded results in non-uniform distortions in the point cloud. For example, some of points have been shifted from their expected locations, resulting in lines or gaps between points and a reduction in fidelity.

In some implementations, these distortions can be eliminated or otherwise reduced using one or more techniques.

In some implementations, the output of a codec can be a fixed point. The number of fixed point bits can be configured in a set of parameters associated with the encoding and decoding process (e.g., in a sequence parameter set (SPS) in accordance with the High Efficiency Video Coding (HEVC) standard). The fractional parts can be non-zero if geometry quantization is used with a non-power-of-two quantization step size QS.

As another example, the exponential function $f(QP)=QS$ can be selected such at some or all of the quantization step sizes QS are integers, given positive integer quantization parameters QP. In some implementations, the function $f(QP)=QS$ can be selected such that, for positive integer quantization parameters QP, no more than five of the quantization step sizes QP outputted by the function are non-integers. As an example, QS can be determined using the relationship $QS=(1+0.25\times\text{mod}\,[QP, 4])\times 2^{\lfloor QP/4\rfloor}$. In this example, given positive integer quantization parameters QP, only QP=1, 2, 3, 5, and 7 results in QS having non-integer values. Values of QS are linearly distributed within each power-of-two interval. Accordingly, the spatial distortions are eliminated or otherwise reduced during the encoding and decoding process, due to the elimination or reduction of rounding of the position values for points. Further, as the quantization step size is substantially limited to powers of two, this substantially eliminates the need to perform per-point multiplications during the decoding process, as they may be replaced by shifts. In some implementations, as a result, no extra overhead is required.

An integer implementation of the scaling process may be implemented as follows. First, the fixed-point quantization step size is determined as Shift=QP>>2; qsTimesFour=(4+(QP & 3))<<Shift, where ">>" and "<<" represent right and left shift operators, and "&" represents a bitwise AND operator. Secondly, scaling is performed as (Pos×qsTimesFour)>>2, where Pos is the quantised portion of the point position. In some embodiments scaling may include an offset to perform "rounding" or approximation: (Pos×qsTimesFour+2)>>2.

In the examples described above, an increase of four in the quantization parameter QP results in a doubling of the quantization step size QS. Within each power-of-two doubling interval, intermediate quantization step sizes are linearly distributed. However, other relationships are also possible (e.g., to increase or decrease the number of intermediate quantization steps between each doubling of the quantization step size).

For example, in some implementations, an increase of eight in the quantization parameter QP results in a doubling of the quantization step size QS. This can be achieved using the relationship $QS=(1+0.125\times\text{mod}\,[QP, 8])\times 2^{\lfloor QP/8\rfloor}$, such that the number of intermediate quantization steps between each doubling of the quantization step size is increased. In this example, given positive integer quantization parameters QP, and assuming a 21-bit geometry, only 17 integer values of QP in a range from 0 to 168 result in QS having non-integer values (e.g., less than 11%). Accordingly, the spatial distortions are eliminated or otherwise reduced during the encoding and decoding process, due to the elimination or reduction of rounding of the position values for points. Further, an integer implementation of the scaling process may be implemented using Shift=QP>>3; qsTimesEight=(8+(QP & 7))<<Shift; with scaling performed as (Pos×qsTimesEight)>>3, or with rounding of fractional positions as (Pos× qsTimesEight+4)>>3.

As another example, in some implementations, an increase of two in the quantization parameter QP results in a doubling of the quantization step size QS. This can be achieved using the relationship $QS=(1+0.5\times\text{mod}\,[QP, 2])\times 2^{\lfloor QP/2\rfloor}$, such that the number of intermediate quantization steps between each doubling of the quantization step size is reduced. Further, an integer implementation of the scaling process may be implemented using Shift=QP>>1; qsTimesTwo=(2+(QP & 1))<<Shift; with scaling performed as (Pos×qsTimesTwo)>>1, or with rounding of fractional positions as (Pos× qsTimesTwo+1)>>1.

Table 1 shows example values of the quantization parameter QP the quantization step size QS, in accordance with the example relationships described above. In the column QS, the sub-column "2" shows values of the quantization step size QS given a particular quantization parameter QP, when an increase of two in the quantization parameter QP results in a doubling of the quantization step size QS (e.g., in accordance with the relationship $QS=(1+0.5\times\text{mod}\,[QP, 2])\times 2^{\lfloor QP/2\rfloor}$. Further, in the column QS, the sub-column "4" shows values of the quantization step size QS given a particular quantization parameter QP, when an increase of four in the quantization parameter QP results in a doubling of the quantization step size QS (e.g., in accordance with the relationship $QS=(1+0.25\times\text{mod}\,[QP, 4])\times 2^{\lfloor QP/4\rfloor}$. Further, in the column QS, the sub-column "8" shows values of the quantization step size QS given a particular quantization parameter QP, when an increase of eight in the quantization parameter QP results in a doubling of the quantization step size QS (e.g., in accordance with the relationship $QS=(1+0.125\times\text{mod}\,[QP, 8])\times 2^{\lfloor QP/8\rfloor}$.

TABLE 1

Values of QS for quantization parameter (QP) with 2, 4, or 8 QPs per QS doubling interval.

| QP | QS | | |
|---|---|---|---|
| | 2 | 4 | 8 |
| 0 | 1 | 1 | 1 |
| 1 | 1.5 | 1.25 | 1.125 |
| 2 | 2 | 1.5 | 1.25 |
| 3 | 3 | 1.75 | 1.375 |
| 4 | 4 | 2 | 1.5 |
| 5 | 6 | 2.5 | 1.625 |
| 6 | 8 | 3 | 1.75 |
| 7 | 12 | 3.5 | 1.875 |
| 8 | 16 | 4 | 2 |
| 9 | 24 | 5 | 2.25 |
| 10 | 32 | 6 | 2.5 |
| 11 | 48 | 7 | 2.75 |
| 12 | 64 | 8 | 3 |
| 13 | 96 | 10 | 3.25 |
| 14 | 128 | 12 | 3.5 |
| 15 | 192 | 14 | 3.75 |
| 16 | 256 | 16 | 4 |
| 17 | 384 | 20 | 4.5 |
| 18 | 512 | 24 | 5 |
| 19 | 768 | 28 | 5.5 |
| 20 | 1024 | 32 | 6 |
| 21 | 1536 | 40 | 6.5 |
| 22 | 2048 | 48 | 7 |
| 23 | 3072 | 56 | 7.5 |
| 24 | 4096 | 64 | 8 |
| 25 | 6144 | 80 | 9 |
| 26 | 8192 | 96 | 10 |
| 27 | 12288 | 112 | 11 |
| 28 | 16384 | 128 | 12 |
| 29 | 24576 | 160 | 13 |
| 30 | 32768 | 192 | 14 |

As another example, in some implementations, an increase of one in the quantization parameter QP results in a doubling of the quantization step size QS (e.g., such that all intermediate steps between each doubling of the step size are eliminated). This can be achieved using the relationship $QS=2^{QP}$. This can be beneficial, for example, in further reducing implementation complexity. Further, an integer implementation of the scaling process may be implemented as Pos<<QP.

Other relationships between the quantization parameter QP and the quantization step size QS are also possible. For example, in some implementations, an increase of 16, 32, 64, or any other number in the quantization parameter QP can result in a doubling of the quantization step size QS. In some implementations, the number of quantization parameters that generate fractional step sizes is $(p\times\log_2 p)-p+1$, where p is the number of QPs per doubling of QS.

During a decoding process, the position of a point can be determined by reversing one or more of the encoding techniques described above.

For example, as described above, a data structure can be encoded such that it represents the positions of multiple points in a point cloud in the three-dimensional space. In particular, the position of each point in each dimension can be represented by a corresponding sequence of bits. Further, at least some of the sequences of bits can indicate the positions of bits according to a partial quantization or scaling (e.g., as described above).

During a decoding process, sequences of bits that have been partially quantized or scaled can be partitioned into two portions: (i) a first portion including the first d bits of the binary sequence, where d is a particular depth (e.g., representing bits that have not been quantized by the encoder), and (ii) a second portion including the remaining bits of the binary sequence, where the second portion had been quantized according to a chosen quantization parameter during the encoding process.

The second portion of bits can be scaled to reverse the quantization (e.g., prefixing leading zero bits corresponding to the Floor(Log 2 (QS)) reduction in levels from quantization and by multiplying a value indicated by the second portion of bits by the quantization step size that was previously used to quantize that particular portion of bits during the encoding process. The scaled second portion can be recombined with the first portion of bits (e.g., by appending the scaled second portion of bits to the end of the first portion of bits) to reconstruct the quantized position of a point. In turn, the reconstructed positions of the points can be used to render the point cloud (e.g., as a part of virtual reality content or augmented reality content).

Signaling Quantization Step Size:

In some implementations, the position of points can be scaled (e.g., "inverse quantized") at one or more levels of the tree data structure. For example, the tree data structure can include one or more offset values indicating a difference or "offset" between the quantization parameter QP for a portion of the tree data structure (e.g., the quantization parameter QP for one or more levels of the tree data structure) relative to a "base" or "default" quantization parameter QP (e.g., a base or default quantization parameter QP for the tree data structure).

In some implementations, the geometry tree level at which scaling occurs can be signaled on a per-tree-data structure level (e.g., a per "geometry slice" level). For example, the tree level can be signaled using a parameter geom_octree_qp_offset_depth which is turn is used to derive the geometry scaling depth (e.g., a parameter GeomScalingDepth) and the scaling node size (e.g., a parameter ScalingNodeSizeLog 2). In some implementations, this parameter can be signaled in a header of the tree data structure (e.g., a portion of the data structure that precedes encoded data regarding the position of points in the point cloud). This can be preferable in some circumstances. For example, in some implementations, signaling this parameter in a header can potentially reduce resource consumption (e.g., by reducing the need to perform additional memory copying or concatenation techniques) if the value of the parameter is known prior to encoding.

However, in some implementations, it may be preferable to indicate at the start of each tree level (e.g., using a data flag), whether offset values are present for that particular tree level (and correspondingly, whether scaling should be performed with respect to that tree level). In some implementations, this can be indicated using a data flag included at the start of each tree level of the tree data structure (e.g., a data flag geom_octree_qp_offsets_present_flag). After the flag has been set, it is not signaled for any subsequent tree levels in the tree data structure (e.g., any lower tree levels in the tree data structure). This data flag has the effect of signaling a unique depth at which offsets are present. Further, with the inclusion of the data flag, a variable specifying the geometry scaling depth (e.g., GeomScalingDepth) is no longer necessary, and the scaling node size (e.g., ScalingNodeSizeLog 2) can be derived from the current node size when the flag is asserted.

To illustrate, example syntax for a tree data structure (e.g., a "geometry slice") is shown below.

TABLE 2

Example syntax for a geometry slice.

| | Descriptor |
|---|---|
| geometry_slice_data( ) { | |
|   depthX = depth Y = depthZ = 0; | |
|   nodeQpOffsetsSignalled = 0 | |
|   for( depth = 0; depth < MaxGeometryOctreeDepth; depth++ ) { | |
|     if(!nodeQpOffsetsSignalled && geom_qp_offsets_enabled_flag ) { | |
|       node_qp_offsets_present_flag | ae(v) |
|       if( node_qp_offsets_present_flag ) | |
|         nodeQpOffsetsSignalled = 1 | |
|     } | |
|     for( nodeIdx = 0; nodeIdx < NumNodesAtDepth[ depth ]; nodeIdx++ ) { | |
|       xN = NodeX[ depthX ][ nodeIdx ] | |
|       yN = NodeY[ depthY ][ nodeIdx ] | |
|       zN = NodeZ[ depthZ ][ nodeIdx ] | |
|       geometry_node( depthX, depthY, depthZ, partitionSkip, nodeIdx, xN, yN, zN ) | |
|     } | |
|     if ( !(partitionSkip & 4) ) | |
|       depthX = depthX + 1; | |
|     if ( !(partitionSkip & 2) ) | |
|       depthY = depthY + 1; | |
|     if ( !(partitionSkip & 1) ) | |
|       depthZ = depthZ + 1; | |
|   } | |
|   if ( log2_trisoup_node_size > 0 ) | |
|     geometry_trisoup_data( ) | |
| } | |

Further, example syntax of encoding each geometry node is shown below:

TABLE 3

Example syntax for a geometry node.

| | Descriptor |
|---|---|
| geometry_node( depthX, depthY, depthZ, partitionSkip, nodeIdx, xN, yN, zN ) { | |
|   if( node_qp_offsets_present_flag ) { | |
|     geom_node_qp_offset_eq0_flag | ae(v) |
|     if( !geom_node_qp_offset_eq0_flag) { | |
|       geom_node_qp_offset_sign_flag | ae(v) |
|       geom_node_qp_offset_abs_minus1 | ae(v) |
|     } | |
|   } | |
|   if( EffectiveDepth < MaxGeometryOctreeDepth ) { | |
|     single_occupancy( nodeIdx ) | |
|     if( !single_occupancy_flag && !two_planar_flag[nodeIdx])) | |
|       if( bitwise_occupancy_flag ) | |
|         occupancy_map | ae(v) |
|       else | |
|         occupancy_byte | de(v) |
|   } | |
|   if( EffectiveDepthX >= MaxNodeSizeXLog2 - 1 && | |

TABLE 3-continued

Example syntax for a geometry node.

| | Descriptor |
|---|---|
| EffectiveDepthY >= MaxNodeSizeYLog2 − 1 && <br> EffectiveDepthZ >= MaxNodeSizeZLog2 − 1 ) { <br>     if( !unique_geometry_points_flag ) <br>         for( child = 0; child < GeometryNodeChildrenCnt; child++ ) { <br>             num_points_eq1_flag[ child ] <br>             if( !num_points_eq1_flag ) <br>                 num_points_minus2[ child ] <br>         } <br>     } else { <br>         if( geometry_planar_mode_flag ) { <br>             for( child = 0; child < GeometryNodeChildrenCnt; child++ ) <br>                 for( axisIdx = 0; axisIdx <= 2; axisIdx++ ) <br>                     if (eligible_planar_flag[axisIdx]) <br>                         geometry_planar_mode_data(child, axisIdx ) <br>         } <br>         if( DirectModeFlagPresent ) <br>             geometry_direct_mode_data( 0 ) <br>     } <br> } | <br><br><br><br>ae(v)<br><br>ae(v) |

In Tables 2 and 3, the bolded lines indicate syntax that can be used to signal the depth at which offset values are signaled.

As shown above, the data within a geometry slice includes a sequence of geometry nodes. Rather than signaling, in a header of the geometry slice, the geometry tree level at which scaling occurs can be signaled on a per-tree-data structure level, a data flag (e.g., node_qp_offsets_present_flag) can be used to indicate, at the start of each tree level, whether offset values are present for that particular tree level (and correspondingly, whether scaling should be performed with respect to that tree level). Since the flag occurs infrequently, at most once per level, some embodiments will encode the flag using a bypass mode of an entropy encoder.

The semantics for such a flag may be that node_qp_offsets_present_flag equal to 1 indicates that geom_node_qp_offset_eq0_flag is present in each geometry node of the current tree level. node_qp_offsets_present_flag equal to 0 indicates that geom_node_qp_offset_eq0_flag is not present in any geometry node of the current tree level. When not present, geom_node_qp_offset_eq0_flag is inferred to be equal to 0.

In this example, the bit stream of data does not include any markers indicating the first node in a particular tree level (e.g., the first node a particular depth). However, this can be accounted for in the specification of the codec. For example, in some implementations, the codec can specify that there is always a first level that contains one node, and that the occupancy information of all the nodes in one level indicates the number of nodes in the next level).

In some implementations, the geometry node syntax above can be modified such that the data flag node_qp_offsets_present is decoded when !nodeQpOffsetsSignalled and nodeIdx=0.

Example Processes

Figure 5A:
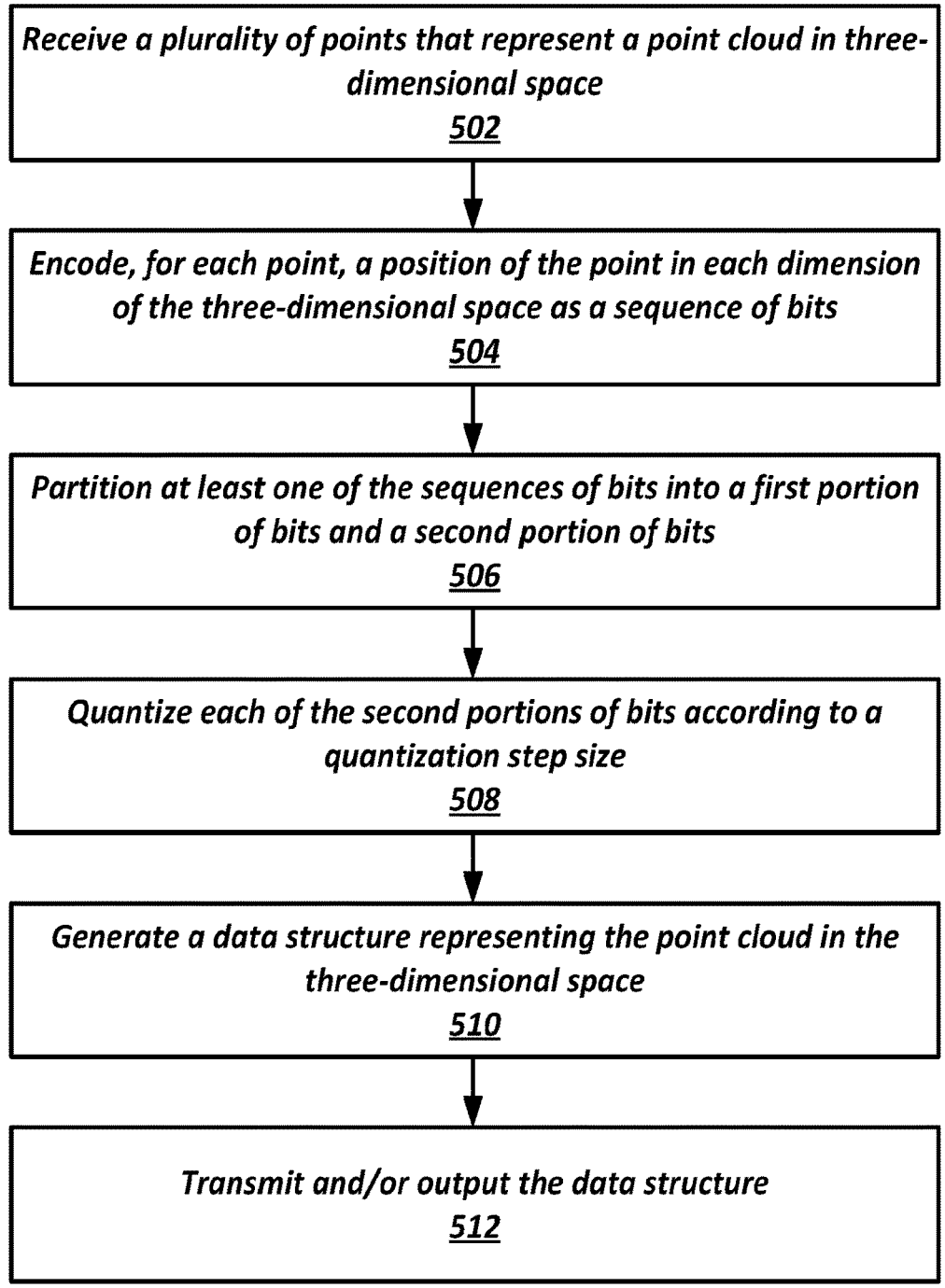
FIG. 5A illustrates an example process of generating a data structure representing a point cloud.

FIG. 5A shows an example process 500 for generating a data structure representing a point cloud in three-dimensional space. The process 500 can be performed, at least in part, using one or more devices (e.g., one or more of the computer systems shown in FIG. 8).

According to the process 500, a computer system receives a plurality of points that represent a point cloud in three-dimensional space (block 502).

The computer system represents a position of the point in each dimension of the three-dimensional space as a sequence of bits (block 504). The position of the point is represented according to a tree data structure. In some implementations, the tree data structure can be an octree.

The computer system partitions at least one of the sequences of bits into a first portion of bits and a second portion of bits (block 506). In some implementations, this can include partitioning at least one of the sequences of bits such that the first portions of bits includes the first d bits from a corresponding one of the sequences of bits, where d is a scaling depth of the tree data structure. Further, this can include partitioning at least one of the sequences of bits such that each of the second portions of bits includes a remainder of bits (e.g., the bits other than the first d bits) from the corresponding one of the sequences of bits.

The computer system quantizes each of the second portions of bits according to a quantization step size (block 508). The quantization step size is determined according to an exponential function having a quantization parameter value as an input and the quantization step size as an output. In some implementations, quantizing each of the second portions of bits can include dividing a numerical value indicated by the second portions of bits by the quantization step size.

In some implementations, the exponential function can be selected such that, for positive integer quantization parameter values, a majority of the quantization step sizes outputted by the exponential function are integers. In some implementations, the exponential function can be selected such that, for positive integer quantization parameter values, N of the quantization step sizes outputted by the exponential function are non-integers, where $N=(p \times \log_2 p)-p+1$, and where p is the number of quantization parameters per doubling of quantization step size. In some implementations, the exponential function can be $QS=(1+0.125 \times \text{mod} [QP, 8]) \times 2^{\lfloor QP/8 \rfloor}$, where QS is the quantization step size, and QP is the quantization parameter value.

The computer system generates a data structure representing the point cloud in the three-dimensional space (block 510). The data structure includes the quantized second portions of bits.

The computer system transmits and/or stores the data structure (block 512).

In some implementations, the computer system can also approximate at least some of the quantized second portions of bits as integer values, and include the approximated second portions of bits in the data structure.

In some implementations, the computer system can also indicate at least one of the quantization step size or the quantization parameter value in the data structure.

Figure 5B:
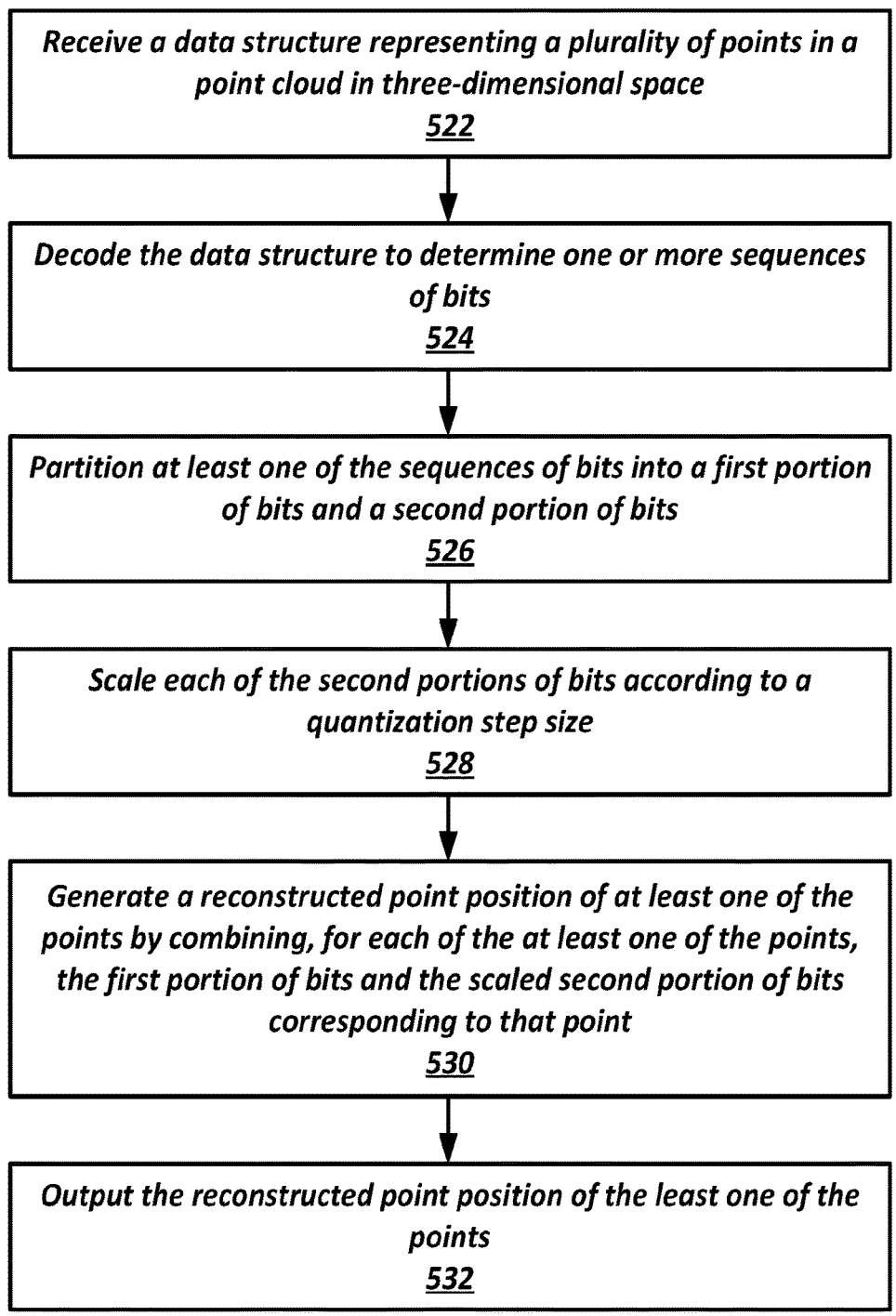
FIG. 5B illustrates an example process of rendering three-dimensional content based on a data structure representing a point cloud.

FIG. 5B shows an example process 520 for rendering three-dimensional content based on a data structure representing a point cloud. The process 520 can be performed, at least in part, using one or more devices (e.g., one or more of the computer systems shown in FIG. 9).

According to the process 520 a computer system receives a data structure representing a plurality of points in a point cloud in three-dimensional space (block 522).

The computer system decodes the data structure to determine one or more sequences of bits (block 524). Each of the sequences of bits represents a position of one of the points in one of the dimensions of the three-dimensional space. The data structure is decoded according to a tree data structure. In some implementations, the tree data structure can be an octree.

The computer system partitions at least one of the sequences of bits into a first portion of bits and a second portion of bits (block 526). In some implementations, at least some of the sequences of bits such can be partitioned such that each of the first portions of bits includes the first d bits from a corresponding one of the sequences of bits, where d is a scaling depth of the tree data structure. Further, at least some of the sequences of bits such can be partitioned such that each of the second portions of bits includes a remainder of bits from the corresponding one of the sequences of bits.

The computer system scales each of the second portions of bits according to a quantization step size (block 528). The quantization step size is determined according to an exponential function having a quantization parameter value as an input and the quantization step size as an output. In some implementations, scaling each of the second portions of bits can include multiplying a numerical value indicated by each of the second portions of bits by the quantization step size.

In some implementations, the exponential function can be selected such that, for positive integer quantization parameter values, a majority of the quantization step sizes outputted by the exponential function are integers.

In some implementations, the exponential function can be selected such that, for positive integer quantization parameter values, N of the quantization step sizes outputted by the exponential function are non-integers, where $N=(p \times \log_2 p) - p + 1$, and where p is the number of quantization parameters per doubling of the quantization step size.

In some implementations, the exponential function can be $QS=(1+0.125 \times \mathrm{mod}\,[QP, 8]) \times 2^{\lfloor QP/8 \rfloor}$, where QS is the quantization step size, and QP is the quantization parameter value.

The computer system generates a reconstructed point position of at least one of the points by combining, for each of the at least one of the points, the first portion of bits and the scaled second portion of bits corresponding to that point (block 530).

The computer system outputs the reconstructed point position of the least one of the points (block 532).

In some implemented, the quantization step size and/or the quantization parameter value can be indicated or included in the data structure.

In some implementations, the process can also include rendering three-dimensional content based on the reconstructed point position of the least one of the points. The three-dimensional content can be virtual reality content and/or augmented reality content.

Figure 6A:
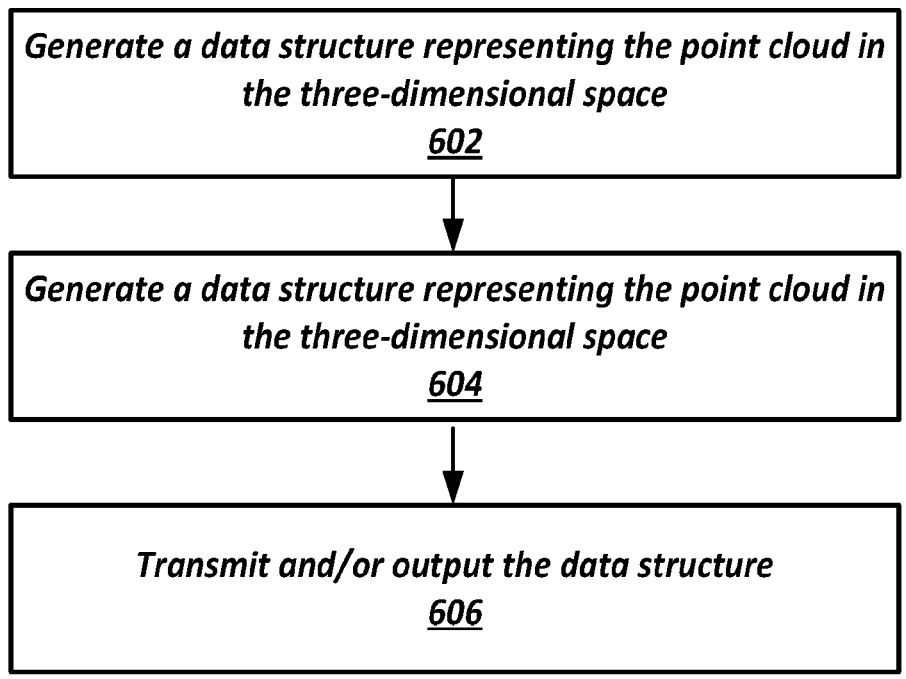
FIG. 6A illustrates an example process of generating a data structure representing a point cloud.

FIG. 6A shows an example process 600 for generating a data structure representing a point cloud in three-dimensional space. The process 600 can be performed, at least in part, using one or more devices (e.g., one or more of the computer systems shown in FIG. 9).

According to the process 600, a computer system receives a plurality of points that represent a point cloud in three-dimensional space (block 602).

The computer system generates a data structure representing the point cloud in the three-dimensional space (block 604). The data structure includes a header portion, and a data portion following the header portion. The data portion indicates, for each of the points, a position of a point encoded according to a tree data structure and quantized according to a corresponding quantization parameter. The tree data structure has a plurality of tree levels. In some implementations, the tree data structure can be an octree.

Further, the data portion includes offset values indicating, at one or more of the tree levels, a difference between the quantization parameter used to quantize the positions of the points at the one or more tree levels and a base quantization parameter. The data portion includes, at each of the one or more tree levels, a data flag indicating a presence of one or more of the offset values at that tree level.

In some implementations, for each of the one or more tree levels, the data flag can be included at a beginning of that tree level.

In some implementations, the header portion does not include data indicating a presence of the offset values.

The computer system transmits or stores the data structure (block 606).

Figure 6B:
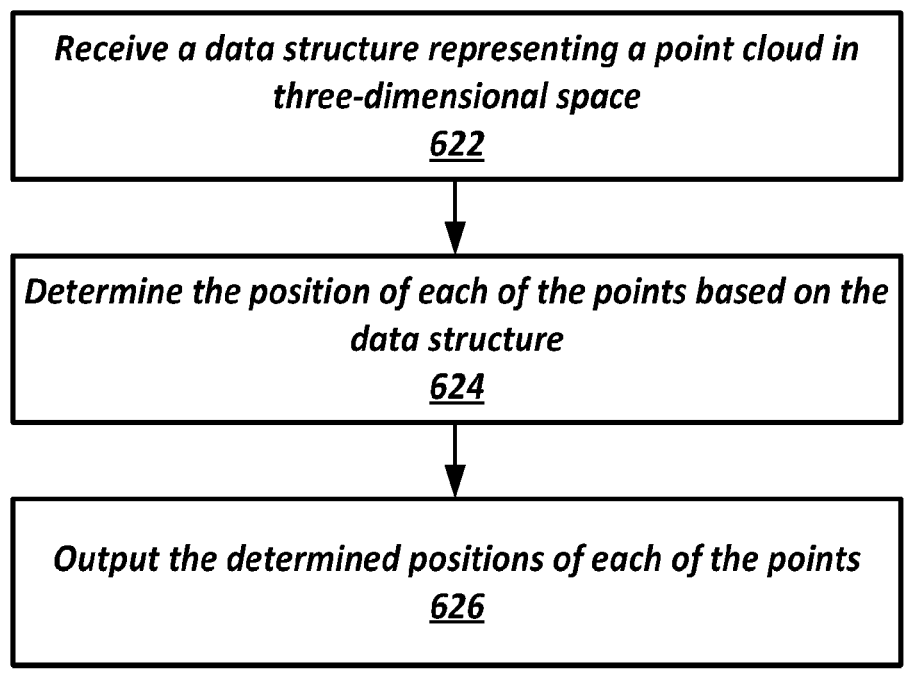
FIG. 6B illustrates an example process of rendering three-dimensional content based on a data structure representing a point cloud.

FIG. 6B shows an example process 620 for rendering three-dimensional content based on a data structure representing a point cloud. The process 620 can be performed, at least in part, using one or more devices (e.g., one or more of the computer systems shown in FIG. 9).

According to the process 620, a computer system receives a data structure representing a point cloud in three-dimensional space (block 622). The point cloud has a plurality of points. The data structure includes a header portion, and a data portion following the header portion. The data portion indicates, for each of the points, a position of a point encoded according to a tree data structure and quantized according to a corresponding quantization parameter. The tree data structure has a plurality of tree levels. In some implementations, the tree data structure can be an octree.

Further, the data portion includes offset values indicating, at one or more of the tree levels, a difference between the quantization parameter used to quantize the positions of the points at the one or more tree levels and a base quantization parameter. The data portion includes, at each of the one or more tree levels, a data flag indicating a presence of one or more of the offset values at that tree level.

The computer system determines the position of each of the points based on the data structure (block 624). In some implementations, this can include determining, based on the data flag at a particular tree level, that one or more of the offset values are present at that tree level; determining the quantization parameter used to quantize the positions of the points that tree level based on the offset values at that tree level; and determining the position of each of the points at that tree level based on the determined quantization parameter.

The computer system outputs the determined positions of each of the points (block 626).

In some implementations, the method can also include rendering three-dimensional content based on the determined positions of each of the points. The three-dimensional content can be at least one of virtual reality content or augmented reality content.

Figure 7:
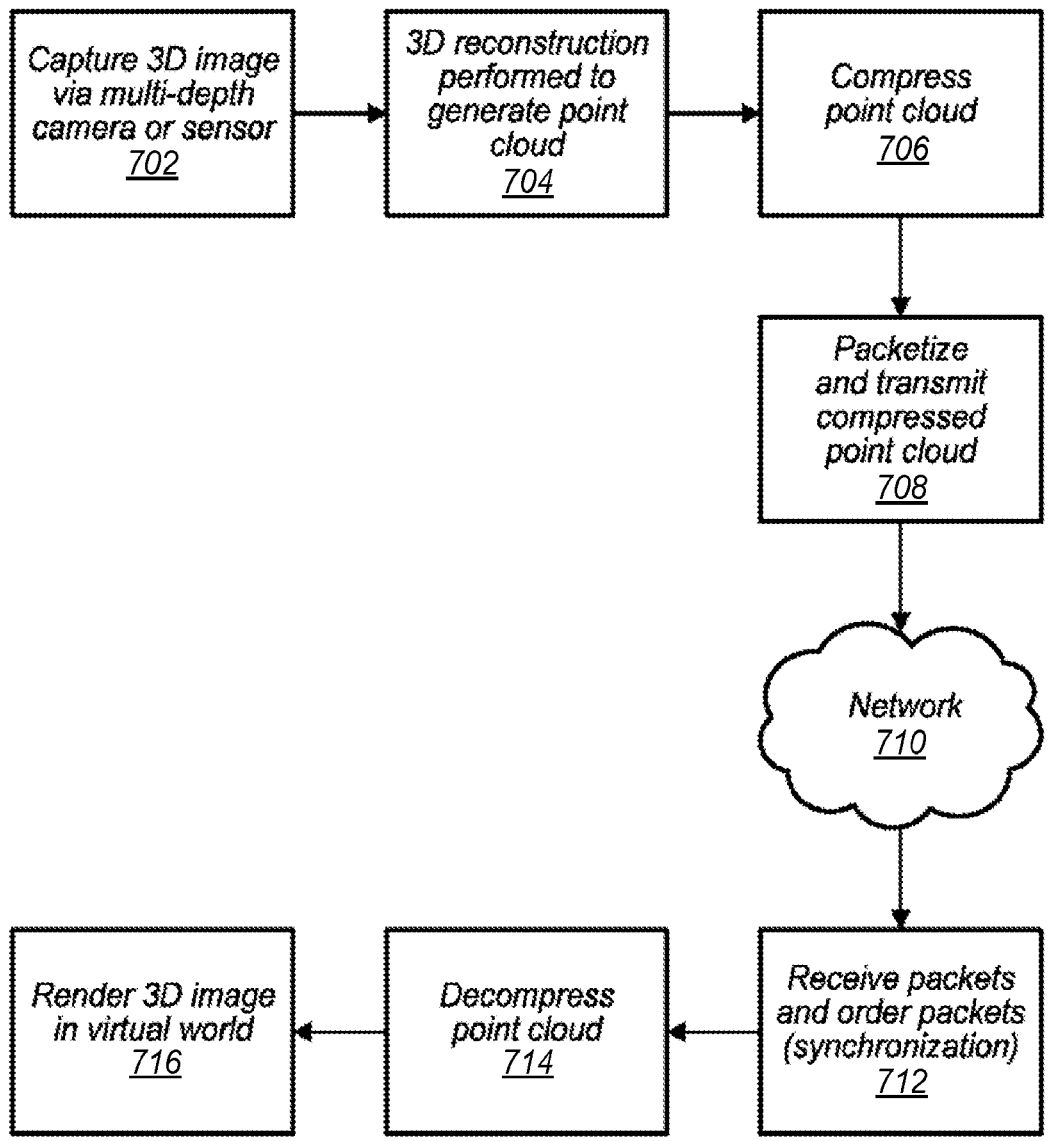
FIG. 7 illustrates compressed point cloud information being used in a 3-D application.

FIG. 7 illustrates compressed point clouds being used in a 3-D application.

In some embodiments, a sensor, such as sensor 102, an encoder, such as encoder 104, and a decoder, such as decoder 116, may be used to communicate point clouds in a 3-D application. For example, a sensor, such as sensor 102, at 702 may capture a 3D image and at block 704, the sensor or a processor associated with the sensor may perform a 3D reconstruction based on sensed data to generate a point cloud.

At block 706, an encoder such as encoder 104 may compress the point cloud and at block 708 the encoder or a post processor may packetize and transmit the compressed point cloud, via a network 710. At block 712, the packets may be received at a destination location that includes a decoder, such as decoder 116. The decoder may decompress the point cloud at block 714 and the decompressed point cloud may be rendered at block 716. In some embodiments, a 3-D application may transmit point cloud data in real time such that a display at block 716 represents images being observed at block 702. For example, a camera in a canyon may allow a remote user to experience walking through a virtual canyon at block 616.

Figure 8:
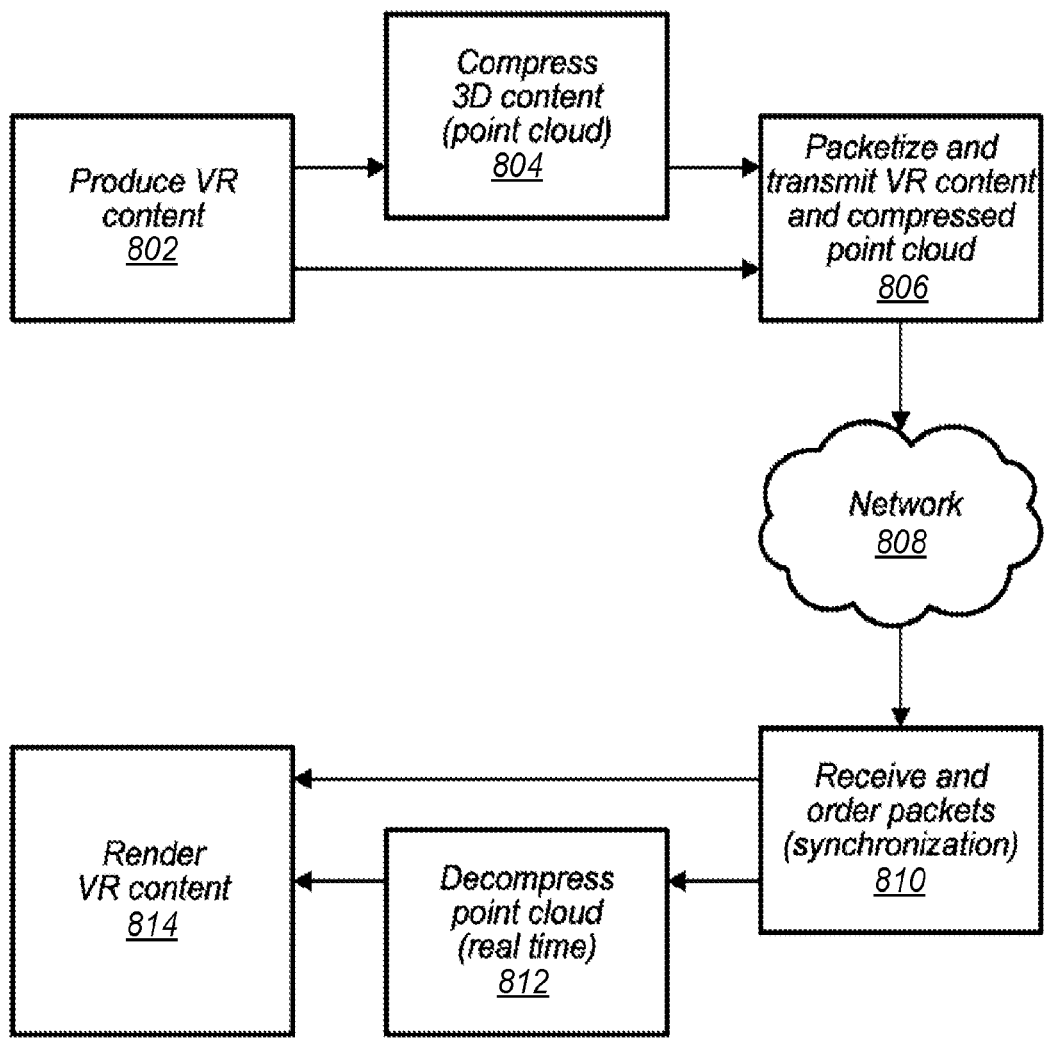
FIG. 8 illustrates compressed point cloud information being used in a virtual reality application, according to some embodiments.

FIG. 8 illustrates compressed point clouds being used in a virtual reality (VR) or augmented reality (AR) application.

In some embodiments, point clouds may be generated in software (for example as opposed to being captured by a sensor). For example, at block 802 virtual reality or augmented reality content is produced. The virtual reality or augmented reality content may include point cloud data and non-point cloud data. For example, a non-point cloud character may traverse a landscape represented by point clouds, as one example. At block 804, the point cloud data may be compressed and at block 806 the compressed point cloud data and non-point cloud data may be packetized and transmitted via a network 808. For example, the virtual reality or augmented reality content produced at block 802 may be produced at a remote server and communicated to a VR or AR content consumer via network 808. At block 810, the packets may be received and synchronized at the VR or AR consumer's device. A decoder operating at the VR or AR consumer's device may decompress the compressed point cloud at block 812 and the point cloud and non-point cloud data may be rendered in real time, for example in a head mounted display of the VR or AR consumer's device. In some embodiments, point cloud data may be generated, compressed, decompressed, and rendered responsive to the VR or AR consumer manipulating the head mounted display to look in different directions.

In some embodiments, point cloud compression as described herein may be used in various other applications, such as geographic information systems, sports replay broadcasting, museum displays, autonomous navigation, etc.

Example Computer System

Figure 9:
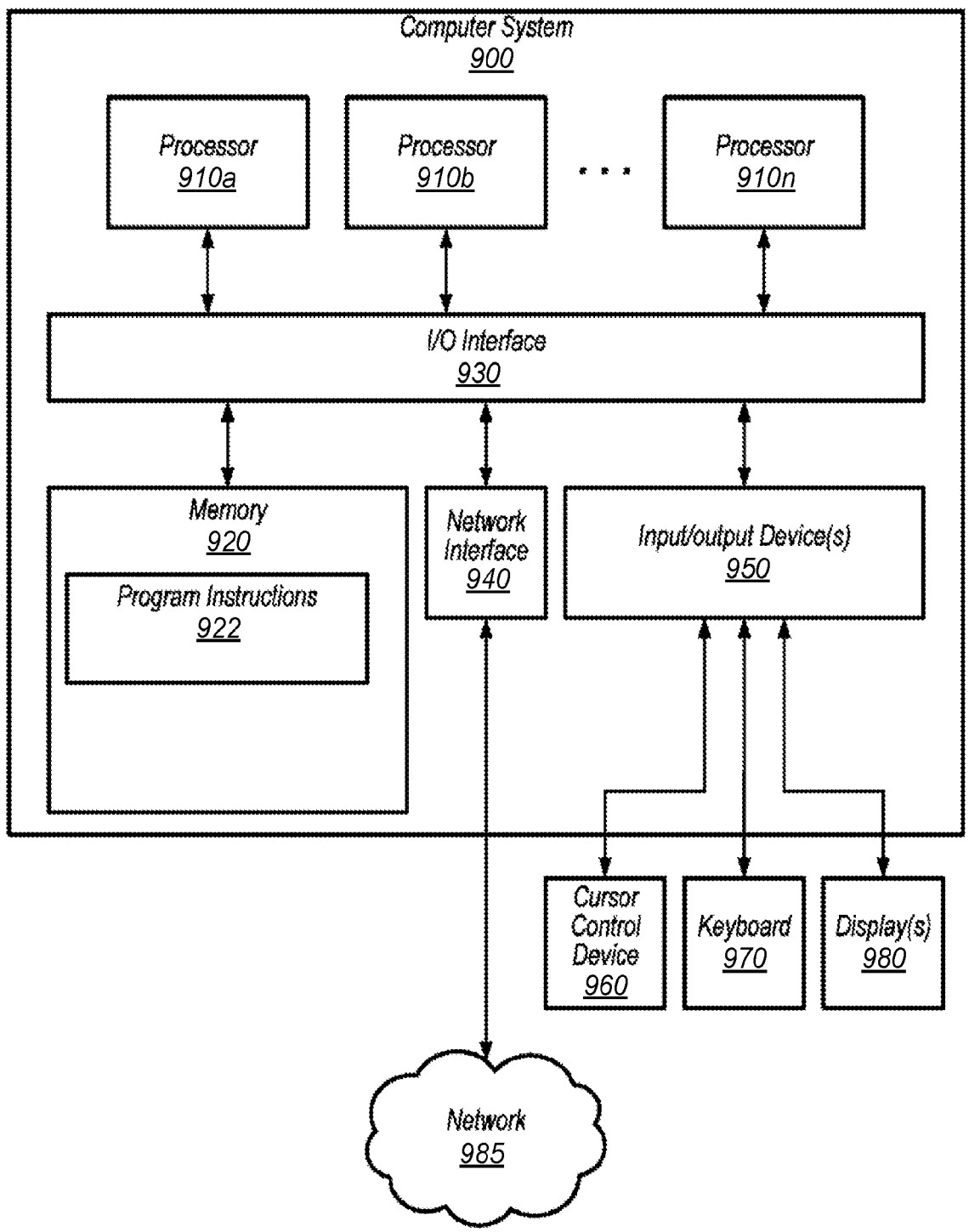
FIG. 9 illustrates an example computer system that may implement an encoder or decoder.

FIG. 9 illustrates an example computer system 900 that may implement an encoder or decoder or any other ones of the components described herein, (e.g., any of the components described above with reference to FIGS. 1-8). The computer system 900 may be configured to execute any or all of the embodiments described above. In different embodiments, computer system 900 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a point cloud encoder or decoder, as described herein may be executed in one or more computer systems 900, which may interact with various other devices. Note that any component, action, or functionality described above with respect to FIGS. 1-8 may be implemented on one or more computers configured as computer system 900 of FIG. 9, according to various embodiments. In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. In some cases, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store point cloud compression or point cloud decompression program instructions 922 and/or sensor data accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions 922 may be configured to implement an image sensor control application incorporating any of the functionality described above. In some embodiments, program instructions and/or data may be received, sent or stored upon different types of computer-accessible media or on similar media separate from system memory 920 or computer system 900. While computer system 900 is described as implementing the functionality of functional blocks of previous Figures, any of the functionality described herein may be implemented via such a computer system.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network 985 (e.g., carrier or agent devices) or between nodes of computer system 900. Network 985 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or accessing data by one or more computer systems 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

As shown in FIG. 9, memory 920 may include program instructions 922, which may be processor-executable to implement any element or action described above. In one embodiment, the program instructions may implement the methods described above. In other embodiments, different elements and data may be included. Note that data may include any data or information described above.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A method comprising:
receiving, by a computer system, a data structure representing a plurality of points in a point cloud in three-dimensional space;
decoding, by the computer system, the data structure to determine one or more sequences of bits, wherein each of the sequences of bits represents a position of one of the points in one of the dimensions of the three-dimensional space, and wherein the data structure is decoded according to a tree data structure;
partitioning, by the computer system, at least one of the sequences of bits into a first portion of bits and a second portion of bits;
scaling, by the computer system, each of the second portions of bits according to a quantization step size, wherein the quantization step size is determined according to an exponential function having a quantization parameter value as an input and the quantization step size as an output;
generating, by the computer system, a reconstructed point position of a first point of the plurality of points by combining, for the first point, the first portion of bits and the scaled second portion of bits corresponding to the first point; and
outputting, by the computer system, the reconstructed point position of the first point.

2. The method of claim 1, wherein the tree data structure is an octree.

3. The method of claim 1, wherein partitioning at least one of the sequences of bits comprises:
 partitioning at least one of the sequences of bits such that each of the first portions of bits includes the first ci bits from a corresponding one of the sequences of bits, wherein d is a scaling depth of the tree data structure, and
 partitioning at least one of the sequences of bits such that each of the second portions of bits includes a remainder of bits from the corresponding one of the sequences of bits.

4. The method of claim 1, wherein scaling each of the second portions of bits comprises multiplying a numerical value indicated by each of the second portions of bits by the quantization step size.

5. The method of claim 1, wherein at least one of the quantization step size or the quantization parameter value is indicated in the data structure.

6. The method of claim 1, wherein the exponential function is selected such that, for positive integer quantization parameter values, a majority of the quantization step sizes outputted by the exponential function are integers.

7. The method of claim 1, wherein the exponential function is selected such that, for positive integer quantization parameter values, N of the quantization step sizes outputted by the exponential function are non-integers, wherein $N=(p \times \log_2 p)-p+1$, and wherein p is the number of quantization parameters per doubling of the quantization step size.

8. The method of claim 1, wherein the exponential function is $QS=(1+0.125 \times \text{mod } [QP,8]) \times 2^{\lfloor QP/8 \rfloor}$, wherein QS is the quantization step size, and QP is the quantization parameter value.

9. The method of claim 1, further comprising rendering three-dimensional content based on the reconstructed point position of the first point, wherein the three-dimensional content is at least one of virtual reality content or augmented reality content.

10. A device comprising:
 one or more processors; and
 memory storing instructions that when executed by the one or more processors, cause the one or more processors to perform operations comprising:
 receiving a data structure representing a plurality of points in a point cloud in three-dimensional space;
 decoding the data structure to determine one or more sequences of bits, wherein each of the sequences of bits represents a position of one of the points in one of the dimensions of the three-dimensional space, and wherein the data structure is decoded according to a tree data structure;
 partitioning at least one of the sequences of bits into a first portion of bits and a second portion of bits;
 scaling each of the second portions of bits according to a quantization step size, wherein the quantization step size is determined according to an exponential function having a quantization parameter value as an input and the quantization step size as an output;
 generating a reconstructed point position of a first point of the plurality of points by combining, for the first point, the first portion of bits and the scaled second portion of bits corresponding to the first point; and
 outputting the reconstructed point position of the first point.

11. The device of claim 10, wherein the tree data structure is an octree.

12. The device of claim 10, wherein partitioning at least one of the sequences of bits comprises:
 partitioning at least one of the sequences of bits such that each of the first portions of bits includes the first d bits from a corresponding one of the sequences of bits, wherein d is a scaling depth of the tree data structure, and
 partitioning at least one of the sequences of bits such that each of the second portions of bits includes a remainder of bits from the corresponding one of the sequences of bits.

13. The device of claim 10, wherein scaling each of the second portions of bits comprises multiplying a numerical value indicated by each of the second portions of bits by the quantization step size.

14. The device of claim 10, wherein at least one of the quantization step size or the quantization parameter value is indicated in the data structure.

15. The device of claim 10, wherein the exponential function is selected such that, for positive integer quantization parameter values, a majority of the quantization step sizes outputted by the exponential function are integers.

16. The device of claim 10, wherein the exponential function is selected such that, for positive integer quantization parameter values, N of the quantization step sizes outputted by the exponential function are non-integers, wherein $N=(p \times \log_2 p)-p+1$, and wherein p is the number of quantization parameters per doubling of the quantization step size.

17. The device of claim 10, wherein the exponential function is $QS=(1+0.125 \times \text{mod } [QP,8]) \times 2^{\lfloor QP/8 \rfloor}$, wherein QS is the quantization step size, and QP is the quantization parameter value.

18. The device of claim 10, the operations further comprising rendering three-dimensional content based on the reconstructed point position of the first point, wherein the three-dimensional content is at least one of virtual reality content or augmented reality content.

19. A non-transitory, computer-readable storage medium having instructions stored thereon, that when executed by one or more processors, cause the one or more processors to perform operations comprising:
 receiving a data structure representing a plurality of points in a point cloud in three-dimensional space;
 decoding the data structure to determine one or more sequences of bits, wherein each of the sequences of bits represents a position of one of the points in one of the dimensions of the three-dimensional space, and wherein the data structure is decoded according to a tree data structure;
 partitioning at least one of the sequences of bits into a first portion of bits and a second portion of bits;
 scaling each of the second portions of bits according to a quantization step size, wherein the quantization step size is determined according to an exponential function having a quantization parameter value as an input and the quantization step size as an output;
 generating a reconstructed point position of a first point of the plurality of points by combining, for the first point, the first portion of bits and the scaled second portion of bits corresponding to the first point; and
 outputting the reconstructed point position of the first point.

20. The non-transitory, computer-readable storage medium of claim 19, wherein the tree data structure is an octree.

* * * * *

UNITED STATES PATENT AND TRADEMARK OFFICE
CERTIFICATE OF CORRECTION

| | | |
|---|---|---|
| PATENT NO. | : 11,869,223 B2 | Page 1 of 1 |
| APPLICATION NO. | : 17/791692 | |
| DATED | : January 9, 2024 | |
| INVENTOR(S) | : David Flynn, Khaled Mammou and Fabrice A. Robinet | |

It is certified that error appears in the above-identified patent and that said Letters Patent is hereby corrected as shown below:

In the Claims

Column 23, Line 6, in Claim 3, delete "ci" and insert -- d --;

Column 24, Line 26, in Claim 16, delete "N-" and insert -- N= --.

Signed and Sealed this
Thirtieth Day of April, 2024

Katherine Kelly Vidal
*Director of the United States Patent and Trademark Office*